(12) United States Patent
Harrison et al.

(10) Patent No.: US 12,166,541 B2
(45) Date of Patent: Dec. 10, 2024

(54) MULTI-RESOURCE UPLINK SOUNDING AND ANTENNA SUBSET TRANSMISSION

(71) Applicant: TELEFONAKTIEBOLAGET LM ERICSSON (PUBL), Stockholm (SE)

(72) Inventors: Robert Mark Harrison, Grapevine, TX (US); Niklas Wernersson, Kungsängen (SE); Sebastian Faxer, Järfälla (SE); Andreas Nilsson, Gothenburg (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 67 days.

(21) Appl. No.: 16/621,500

(22) PCT Filed: Jun. 15, 2018

(86) PCT No.: PCT/SE2018/050632
§ 371 (c)(1),
(2) Date: Dec. 11, 2019

(87) PCT Pub. No.: WO2018/231141
PCT Pub. Date: Dec. 20, 2018

(65) Prior Publication Data
US 2020/0162133 A1 May 21, 2020

Related U.S. Application Data

(60) Provisional application No. 62/521,028, filed on Jun. 16, 2017.

(51) Int. Cl.
*H04B 7/0404* (2017.01)
*H04B 7/0456* (2017.01)
(Continued)

(52) U.S. Cl.
CPC ......... *H04B 7/0404* (2013.01); *H04B 7/0482* (2013.01); *H04B 7/0486* (2013.01);
(Continued)

(58) Field of Classification Search
CPC .. H04B 7/0404; H04B 7/0482; H04B 7/0486; H04B 7/0617; H04B 7/0691;
(Continued)

(56) References Cited

U.S. PATENT DOCUMENTS

2016/0142115 A1   5/2016   Onggosanusi et al.

FOREIGN PATENT DOCUMENTS

| CN | 103069902 A | 4/2013 |
|---|---|---|
| CN | 103138869 A | 6/2013 |

(Continued)

OTHER PUBLICATIONS

Ericsson, "UL beam management details", 3GPP TSG-RAN WG1 #89, Hangzhou, China, May 15-19, 2017, pp. 1-3, R1-1708677, 3GPP.
(Continued)

*Primary Examiner* — Justin T Van Roie

(57) ABSTRACT

According to some aspects of the techniques disclosed herein, a UE adapted to transmit on different antenna subsets transmits an indication that the UE can transmit a number of distinct RS resources, where each of the RS resources comprises at least one RS port. The UE transmits capability information indicating that the UE is capable of transmitting simultaneously on multiple RS resources and/or receives first and second RS configurations, where the first RS configuration is a first list of SRS resources that at least correspond to RS resource indications used for PUSCH transmission, and the second RS configuration is a second list of RS resources that may be used for SRS transmission. The UE receives an indication of at least one RS resource and transmits a physical channel on antennas of the UE associated with the indicated RS resources.

29 Claims, 17 Drawing Sheets

(51) Int. Cl.
  *H04B 7/06*   (2006.01)
  *H04L 5/00*   (2006.01)
  *H04L 25/02*  (2006.01)
  *H04W 52/08*  (2009.01)
  *H04W 52/24*  (2009.01)

(52) U.S. Cl.
  CPC ......... *H04B 7/0617* (2013.01); *H04B 7/0691* (2013.01); *H04L 5/0051* (2013.01); *H04L 25/0226* (2013.01); *H04W 52/08* (2013.01); *H04W 52/248* (2013.01)

(58) Field of Classification Search
  CPC . H04B 7/0456; H04L 5/0051; H04L 25/0226; H04L 5/0023; H04L 5/0094; H04W 52/08; H04W 52/248
  See application file for complete search history.

(56) References Cited

FOREIGN PATENT DOCUMENTS

| | | |
|---|---|---|
| CN | 103688586 A | 3/2014 |
| CN | 103905104 A | 7/2014 |
| CN | 104137437 A | 11/2014 |
| CN | 104485984 A | 4/2015 |
| CN | 104641678 A | 5/2015 |
| CN | 105991267 A | 10/2016 |
| EP | 2335360 A2 | 6/2011 |
| EP | 2343849 A2 | 7/2011 |
| EP | 2779514 A2 | 9/2014 |
| EP | 2940885 A2 | 11/2015 |
| JP | 2018504027 A | 2/2018 |
| JP | 7021264 B2 | 2/2022 |
| RU | 2504076 C2 | 1/2014 |
| WO | 2010107880 A2 | 9/2010 |
| WO | 2011100520 A1 | 8/2011 |
| WO | 2011123805 A1 | 10/2011 |
| WO | 2013058624 A1 | 4/2013 |
| WO | 2013169160 A1 | 11/2013 |
| WO | 2014101055 A1 | 7/2014 |
| WO | 2016095110 A1 | 6/2016 |
| WO | 2018151554 A1 | 8/2018 |

OTHER PUBLICATIONS

Intel et al., "Way Forward on Uplink Multi-panel and Multi-TRP operation", 3GPP TSG-RAN WG1 #89, Hangzhou, P.R. China, May 15-19, 2017, pp. 1-2, R1-1709735, 3GPP.

LG Electronics, "Discussion on non-codebook based transmission for UL", 3GPP TSG RAN WG1 Meeting#88bis, Spokane, USA, Apr. 3-7, 2017, pp. 1-5, R1-1704874, 3GPP.

Nokia et al., "SRS transmission for beam management", 3GPP TSG-RAN WG1 #89, Hangzhou, P.R. China, May 15-19, 2017, pp. 1-3, R1-1708912, 3GPP.

LG Electronics, "Considerations on NR SRS design", 3GPP TSG RAN WG1 Meeting #87, Reno, USA, Nov. 14-18, 2016, pp. 1-6, R1-1611808, 3GPP.

Media Tek Inc., "Codebook based transmission for UL", 3GPP TSG RAN WG1 Meeting NR #3, Nagoya, Japan, Sep. 18-21, 2017, pp. 1-23, R1-1716785, 3GPP.

CATT, "Further discussion on codebook based transmission for UL", 3GPP TSG RAN WG1 Meeting 90bis, Prague, CZ, Oct. 9-13, 2017, pp. 1-5, R1-1717807, 3GPP.

Ericsson, "UL MIMO procedures for codebook based transmission", 3GPP TSG-RAN WG1 #89, Hangzhou, P.R. China, May 15-19, 2017, pp. 1-9, R1-1708669, 3GPP.

LG Electronics, "Discussion on UL beam management", 3GPP TSG-RAN WG1 #89, Hangzhou, P.R. China, May 15-19, 2017, pp. 1-6, R1-1707605, 3GPP.

Nokia et al., "UL SRS design considerations in NR", 3GPP TSG-RAN WG1 #89, Hangzhou, P.R. China, May 15-19, 2017, pp. 1-7, R1-1708928, 3GPP.

LG Electronics, On SRS design and related operations, 3GPP TSG RAN WG1 Meeting #89, R1-1707618, Hangzhou, China, May 15-19, 2017, pp. 1-6, 3GPP.

Ericsson, "UL MIMO procedures for codebook based transmission," 3GPP TSG-RAN WG1 #89ah-NR, R1-1711008; Qingdao, China, Jun. 27-30, 2017, 8 pages.

MULTI-RESOURCE UPLINK SOUNDING AND ANTENNA SUBSET TRANSMISSION

This application is a 371 of International Application No. PCT/SE2018/050632, filed Jun. 15, 2018, which claims priority to U.S. Provisional Application No. 62/521,028, filed Jun. 16, 2017, the disclosures of which are fully incorporated herein by reference.

TECHNICAL FIELD

The present disclosure is related generally to wireless networks, and is more particularly related to the use and signaling of configurations for uplink sounding reference signals for wireless devices with multiple antennas, including transmitting and receiving on different antenna subsets in wireless device.

BACKGROUND

The next generation mobile wireless communication system currently under development by members of the 3$^{rd}$ Generation Partnership Project (3GPP), often referred to as 5G, or "new radio" (NR), will support a diverse set of use cases and a diverse set of deployment scenarios. The latter includes deployment at both low frequencies (100 s of MHz), similar to today's Long-Term Evolution (LTE) systems, and very high frequencies waves in the tens of GHz).

As was the case with LTE, NR will use Orthogonal Frequency-Division Multiplexing (OFDM) in the downlink (i.e., from a network node, gNB, eNB, or other base station, to a user equipment or UE). In the uplink (i.e., from UE to gNB), both Discrete Fourier Transform (DFT)-spread OFDM and OFDM will be supported.

The basic NR physical resource can thus be seen as a time-frequency grid similar to the one in LTE, as illustrated in FIG. 1, where each resource element corresponds to one OFDM subcarrier during one OFDM symbol interval. Although a subcarrier spacing of $\Delta f=15$ kHz is shown in FIG. 1, different subcarrier spacing values are supported in NR. The supported subcarrier spacing values (also referred to as different numerologies) in NR are given by $\Delta f=(15 \times 2^\alpha)$ kHz, where $\alpha$ is a non-negative integer.

Furthermore, the resource allocation in LTE is typically described in terms of resource blocks (RBs), where a resource block corresponds to one slot (0.5 ms) in the time domain and 12 contiguous subcarriers in the frequency domain. Resource blocks are numbered in the frequency domain, starting with 0 from one end of the system bandwidth. For NR, a resource block is also 12 subcarriers in frequency but for further study in time domain. An RB is also referred to (interchangeably) as a physical RB (PRB) in the discussion that follows.

In the time domain, downlink and uplink transmissions in NR will be organized into equally-sized subframes similar to LTE as shown in FIG. 2. In NR, subframe length for a reference numerology of $(15 \times 2^\alpha)$ kHz is exactly $\frac{1}{2_\alpha}$ ms.

Downlink transmissions are dynamically scheduled, i.e., in each subframe the gNB transmits downlink control information (DCI) about which UE data is to be transmitted to and which resource blocks in the current downlink subframe the data is transmitted on. According to current understandings, this control signaling will typically be transmitted in the first one or two OFDM symbols in each subframe in NR. The control information is carried on a Physical Control Channel (PDCCH) and data is carried on a Physical Downlink Shared Channel (PDCCH). A UE first detects and decodes PDCCH, and, if a PDCCH is decoded successfully, the UE decodes the corresponding PDSCH based on the decoded control information in the PDCCH. Each UE is assigned a C-RNTI (Cell Radio Network Temporary Identifier) that is unique within the same serving cell. The CRC (cyclic redundancy check) bits of a PDCCH for a UE is scrambled by the UE's C-RNTI, so a UE recognizes its PDCCH by checking the C-INTI used to scramble the CRC (cyclic redundancy check) bits of the PDCCH.

Uplink data transmission are also dynamically scheduled using PDCCH A UE first decodes uplink grants in PDCCH and then transmits data over the Physical Uplink Shared Channel (PUSCH), based on the decoded control information in the uplink grant, which may specify modulation order, coding rate, uplink resource allocation, etc.

In LTE, semi-persistent scheduling (SPS) is also supported in both uplink and downlink, whereby a sequence of periodic data transmissions is activated or deactivated by a single PDCCH, With SPS, there is no PDCCH transmitted for data transmissions after activation. In SPS, the PDCCH's CRC is scrambled by a SPS-C-RNTI, which is configured for a UE if the UE supports SPS.

In addition to PUSCH, Physical Uplink Control Channel (PUCCH) is also supported in NR, to carry uplink control information (UCI) such as HARQ (Hybrid Automatic Repeat Request) related Acknowledgement (ACK), Negative Acknowledgement (NACK), or Channel State Information (CSI) feedback.

Codebook-Based Precoding

Multi-antenna techniques can significantly increase the data rates and reliability of a wireless communication system. The performance is particularly improved if both the transmitter and the receiver are equipped with multiple antennas, which results in a multiple-input multiple-output (MIMO) communication channel. Such systems and/or related techniques are commonly referred to as MIMO.

While the NR standard is currently being specified, a core component in NR is expected to be the support of MIMO antenna deployments and MIMO related techniques. It is anticipated that NR will support uplink MIMO, with at least 4-layer spatial multiplexing using at least 4 antenna ports with channel-dependent precoding. The spatial multiplexing mode is aimed for high data rates in favorable channel conditions. An illustration of the spatial multiplexing operation is provided in FIG. 3 for the case where CP-OFDM (Cyclic Prefix OFDM) is used on the uplink.

As seen, the information carrying symbol vectors is multiplied by an $N_T \times r$ precoder matrix W, which serves to distribute the transmit energy in a subspace of the $N_T$ (corresponding to $N_T$ antenna ports)—dimensional vector space. The precoder matrix is typically selected from a codebook of possible precoder matrices and is typically indicated by means of a transmit precoder matrix indicator (TPMI), which specifies a unique precoder matrix in the codebook for a given number of symbol streams. The r symbols in s each correspond to a layer, and r is referred to as the transmission rank. In this way, spatial multiplexing is achieved since multiple symbols can be transmitted simultaneously over the same time/frequency resource element (TFRE). The number of symbols r is typically adapted to suit the current channel properties.

Because CP-OFDM is supported for uplink MIMO in NR, as opposed to only DFT-spread OFDM for PUSCH in LTE, NR MIMO codebook designs need not be concerned with increases in UE power amplifier peak to average power ratios (PAPR) as a design factor as much as was needed for LTE Rel-10 uplink MIMO. Therefore, both codebooks with limited PAPR increases and those that have relatively high increases in PAPR can be suitable for NR uplink MIMO. Consequently, suitable codebooks for NR uplink MIMO may include the uplink MIMO codebooks defined in clause 5.3.3A of the pre-existing 3GPP technical specification 36.211, as well as the downlink MIMO codebooks in clauses 6.3.4.2.3 of 3GPP technical specification 36.211 and 7.2.4 of 3GPP technical specification 36.213.

The received $N_R \times 1$ vector $y_n$ for a certain TFRE on subcarrier n (or alternatively data TFRE number n) is modeled by:

$$y_n = H_n W s_n + e_n \qquad \text{Equation 1}$$

where $e_n$ is a noise/interference vector obtained as realizations of a random process. The precoder W can be a wideband precoder, which is constant over frequency, or frequency selective.

The precoder matrix W is often chosen to match the characteristics of the $N_R \times N_T$ MIMO channel matrix $H_n$, resulting in so-called channel-dependent precoding. This is also commonly referred to as closed-loop precoding and essentially strives to focus the transmit energy into a subspace which is strong in the sense of conveying much of the transmitted energy to the UE. In addition, the precoder matrix may also be selected to strive for orthogonalizing the channel, meaning that after proper linear equalization at the UE, inter-layer interference is reduced.

One example method for a UE to select a precoder matrix W can be to select the $W_k$ that maximizes the Frobenius norm of the hypothesized equivalent channel:

$$\max_k \left\| \hat{H}_n W_k \right\|_F^2 \qquad \text{Equation 2}$$

where
$\hat{H}_n$ is a channel estimate, possibly derived from sounding reference symbols (SRS).
$W_k$ is a hypothesized precoder matrix with index k.
$\hat{H}_n W_k$ is the hypothesized equivalent channel.

In closed-loop precoding for the NR uplink, a transmission point (TRP) transmits, based on channel measurements in the reverse link (uplink), TPMI to the UE that the UE should use on its uplink antennas. (The term "TRP" may correspond to a particular eNB, gNB, access point, or other transmission point, or to a controller for one or more transmission points.) The gNodeB (gNB) configures the UE to transmit SRS according to the number of UE antennas it would like the UE to use for uplink transmission to enable the channel measurements. A single precoder that is supposed to cover a large bandwidth (wideband precoding) may be signaled. It may also be beneficial to match the frequency variations of the channel and instead feedback a frequency-selective precoding report, e.g., several precoders and/or several TPMIs, one per subband.

Other information than TPMI is generally used to determine the uplink MIMO transmission state, such as SRS resource indicators (Sills) as well as transmission rank indicator (TRIs). These parameters, as well as the modulation and coding state (MCS), and the uplink resources where PUSCH is to be transmitted, are also determined by channel measurements derived from SRS transmissions from the UE. The transmission rank, and thus the number of spatially multiplexed layers, is reflected in the number of columns of the precoder W. For efficient performance, it is important that a transmission rank that matches the channel properties is selected.

CSI-RS Resources

In LTE, a UE can be configured with multiple channel state information reference symbol (CSI-RS) resources for downlink channel state information (CSI) acquisition purpose if Class B eMIMO-Type is used. A CSI-RS resource defines a certain number of CSI-RS at a certain position in the time-frequency resource grid and can be associated with a certain quasi-colocation (QCL) assumption and relative power level towards another reference signal. The CSI-RS in each CSI-RS resource are typically precoded with different precoding weights so as to form different transmit beams. As part of the CSI reporting procedure, the UE may select a preferred CSI-RS resource, corresponding to a preferred transmit beam, with a CSI-RS resource indicator (CRI). The UE then determines an appropriate PMI, RI and corresponding ON for the selected CSI-RS resource by performing a precoder search. Thus, the UE first selects the best CSI-RS resource and then applies a precoder codebook within the selected CSI-RS resource.

Control Signaling

LTE control signaling can be carried in a variety of ways, including on PDCCH or PUCCH, embedded in the PUSCH, in Medium Access Control (MAC) control elements (MAC CEs), or in Radio Resource Control (RRC) signaling. Each of these mechanisms is customized to carry a particular kind of control information.

Control information carried on PDCCH, PUCCH, or embedded in ('piggy backed on') PUSCH is physical layer related control information, such as downlink control information (DCI), uplink control information (UCI), as described in 3GPP TS 36.211, 3GPP TS 36.212, and 3GPP IS 36.213. DCI is generally used to instruct the UE to perform some physical layer function, providing the needed information to perform the function. UCI generally provides the network with needed information, such as HARQ-ACK, scheduling request (SR), channel state information (CSI), including CQI, PMI, RI, and/or CRI. UCI and DCI can be transmitted on a subframe-by-subframe basis, and so are designed to support rapidly varying parameters, including those that can vary with a fast fading radio channel. Because UCI and DCI can be transmitted in every subframe, UCI or DCI corresponding to a given cell tend to be on the order of tens of bits, to limit the amount of control overhead.

Control information carried in MAC CEs is carried in MAC headers on the uplink and downlink shared transport channels (UL-SCH and DL-SCH), as described in 3GPP TS 36.321. Since a MAC header does not have a fixed size, control information in MAC CEs can be sent when it is needed and does not necessarily represent a fixed overhead. Furthermore, MAC CEs can carry larger control payloads efficiently, since they are carried in UL-SCH or DL-SCH transport channels, which benefit from link adaptation, HARQ, and can be turbo coded. MAC CEs are used to perform repetitive tasks that use a fixed set of parameters, such as maintaining timing advance or buffer status reporting, but these tasks generally do not require transmission of a MAC CE on a subframe-by-subframe basis. Consequently, channel state information related to a fast fading radio channel, such as PMI, CQI, RI, and CRI are not carried in MAC CEs in LTE up to Rel-14.

Multi-Panel UE Antenna Arrays

When building UE antenna arrays, it can be challenging to have antennas with the same angular coverage such that they are generally seen by a given receiving TRP at the same power level. This can be particularly challenging at the millimeter-wave frequencies supported by NR. Furthermore, it may be difficult to place all the UE's antennas and transmitter (TX) chains close together in the limited spaces available in small mobile devices. One building practice is to use a modular approach wherein the UE TX chains are split into "panels," with one or more transmit chains per panel, as shown in FIG. 4. Such multi-panel UEs are generally modeled as having panels with element patterns that point in different directions, while antenna elements within a panel have element patterns that point in generally the same directions, as discussed in 3GPP technical report 38.802. Because the transmit chains in different panels can be separated in UEs, it may be more difficult to maintain calibration and phase coherence between antenna elements in different panels than to maintain calibration and phase coherence between antenna elements in a panel. There may thus exist a frequency offset, timing misalignment, and/or a phase offset between the panels. Aspects of phase coherence among TX chains of different panels is further discussed below.

The example in FIG. 4 shows a 4-panel UE array with 8 total antenna elements. Each panel comprises 2 elements, with similar antenna patterns, that are driven by independent TX chains. The antenna element patterns have roughly 90-degree beamwidths, such that all directions are covered by the 4 panels together. Note that while the term "panel" conceptually relates to the notion of having physically distinct and separated groups of antennas, e.g., as implemented on separate printed circuit boards, its use herein should not be understood as being limited to groups of antennas that are separate and distinct in this physical sense.

SRS Transmission in NR

Sounding reference signals (SRS) are used for a variety of purposes in LTE and are expected to serve similar purposes in NR. One primary use for SRS is for uplink channel state estimation, allowing channel quality estimation to enable uplink link adaptation (including determination of which MCS state the UE should transmit with) and/or frequency-selective scheduling. In the context of uplink MIMO, they can also be used to determine precoders and a number of layers that will provide good uplink throughput and/or SINK when the UE uses them for transmission on its uplink antenna array. Additional uses include power control and uplink timing advance adjustment.

Unlike UEs designed according to Release 14 of the LTE standards, at least some NR UEs may be capable of transmitting multiple SRS resources. This is conceptually similar to the use of multiple CSI-RS resources on the downlink: an SRS resource comprises one or more SRS ports, and the HE may apply a beamformer and/or a precoder to the SRS ports within the SRS resource such that they are transmitted with the same effective antenna pattern. A primary motivation for defining multiple SRS resources in the UE is to support analog beamforming in the UE, where a UE can transmit with a variety of beam patterns, but only one at a time. Such analog beamforming may have relatively high directivity, especially at the higher frequencies that can be supported by NR.

Earlier LTE uplink MIMO and transmit diversity designs did not focus on cases where high directivity beamforming could be used on different SRS ports, and so a single SRS resource was sufficient. When an NR UE transmits on different beams, the power received by the TRP can be substantially different, depending on which beam is used. One approach could be to have a single SRS resource, but to indicate to the UE which of its beams to use for transmission. However, since UE antenna designs vary widely among UEs and UE antenna patterns can be highly irregular, it is infeasible to have a predetermined set of UE antenna patterns with which the TRP could control UE uplink preceding or beamforming. Therefore, an NR UE may transmit on multiple SRS resources using a distinct effective antenna pattern on each SRS resource, allowing the TRP to determine the composite channel characteristics and quality for the different effective antenna patterns used by the UE. Given this association of each effective antenna pattern with a corresponding SRS resource, the TRP can then indicate to the UE which of one or more effective antenna patterns should be used for transmission on PUSCH (or other physical channels or signals) through one or more SRS resource indicator, or 'SRIs'.

Depending on UE implementation, it may be possible to maintain the relative phase of the transmit chains with respect to one another. In this case, the UE can form an adaptive array by selecting a beam on each transmit chain, and by transmitting the same modulation symbol on the selected beams of both transmit chains using different gain and/or phase between the transmit chains. This transmission of a common modulation symbol or signal on multiple antenna elements with controlled phase can be labeled 'coherent' transmission'. The support for coherent uplink MIMO transmission in LTE Rel-10 is indicated via a feature group indication for relative transmit phase continuity for uplink spatial multiplexing, wherein a UE indicates whether it can adequately maintain the relative phase of transmit chains over time in order to support coherent transmission.

In other UE implementations, the relative phases of the transmit chains may not be well controlled, and coherent transmission may not be used. In such implementations, it may still be possible to transmit on one of the transmit chains at a time, or to transmit different modulation symbols on the transmit chains. In the latter case, the modulation symbols on each transmit chain may form a spatially multiplexed, or 'MIMO', layer. This class of transmission schemes may be referred to as 'non-coherent' transmission. Such non-coherent transmission schemes may be used by LTE Rel-10 UEs with multiple transmit chains, but that do not support relative transmit phase continuity.

An example use of analog beamforming on multiple transmit chains is diagrammed in FIG. 5. Here, each transmit chain comprises a power amplifier that can be switched among a set of beams produced by a phased array. The transmit chains are grouped into two sets of two transmit chains each. The transmit chains within each set have the same beam directions, while different sets may have beams covering different directions. For illustration, it is assumed that each transmit chain can select one of four analog beams, and the two transmit chain sets point in opposite directions. Each set of transmit chains can therefore correspond to a "panel" as defined in 3GPP TR 38.900 and 3GPP TR 38,802, and so for illustration the term "panel" is used here.

In FIG. 5, it is assumed that effective antenna patterns #0 and #7 are selected for simultaneous transmission on the first and second panels, respectively. However, due to the use of analog beamforming, simultaneous transmission of, for example, effective antenna patterns #0 and #1 are not possible since they are analog beams selected within a panel. Because UE implementations will vary, a mechanism is needed to allow the TRP to determine which effective antenna patterns can be transmitted simultaneously by the UE based on the use of multiple SRS ports and resources. A second problem is how to determine whether coherent transmission is possible among SRS ports associated with different SRS resources. Relative transmit phase continuity of an UE UE applies to all transmit chains, which may be an oversimplification for multi-panel NR UEs, since phase coherence among elements within a panel may be easier to achieve than across panels.

Power Control

Setting output power levels of transmitters, base stations in downlink and mobile stations in uplink, in mobile systems is commonly referred to as power control (PC). Objectives of PC include improved capacity, coverage, improved system robustness, and reduced power consumption.

In LTE, PC mechanisms can be categorized in to the groups (i) open-loop, (ii) closed-loop, and (iii) combined open- and closed loop. These differ in what input is used to determine the transmit power. In the open-loop case, the transmitter measures some signal sent from the receiver, and sets its output power based on this. In the closed-loop case, the receiver measures the signal from the transmitter, and based on this sends a Transmit Power Control (TPC) command to the transmitter, which then sets its transmit power accordingly. In a combined open- and closed-loop scheme, both inputs are used to set the transmit power.

In systems with multiple channels between the terminals and the base stations, e.g. traffic and control channels, different power control principles may be applied to the different channels. Using different principles yields more freedom in adapting the power control principle to the needs of individual channels. The drawback is increased complexity of maintaining several principles.

In, for instance, LTE release 10, the setting of the UE Transmit power for a physical uplink control channel (PUCCH) transmission is defined as follows.

$$P_{PUCCH} = \min\{P_{CMAX,c}, P_{0,PUCCH} + PL_{DL} + \nabla_{Format} + \delta\}$$

Here, $P_{PUCCH}$ is the transmit power to use in a given subframe and $PL_{DL}$ is the pathloss estimated by the UE. For PUSCH, one instead uses the equation:

$$P_{PUSCH,c} = \min\{P_{CMAX,c} - P_{PUCCH}, P_{0,PUSCH} + \alpha PL_{DL} + 10\log_{10}M + \nabla_{MCS} + \delta\}$$

where c denotes the serving cell and $P_{PUSCH,c}$ is the transmit power to use in a given subframe. Also, note that $PL_{DL}$ is a part of setting the power level for the UE transmission. It is clear from this that the pathloss estimation conducted by the UE plays an important role of the PC. The pathloss must in turn be estimated from a downlink (DL) transmission and is typically done by measuring on a reference signal.

SUMMARY

While NR will support multiple SRS transmissions to facilitate the use of analog beamforming in UEs, mechanisms are not yet defined to determine which UE beams can be transmitted simultaneously, nor which can be combined coherently.

According to several embodiments described in detail below, a UE indicates that it can transmit a number of distinct SRS resources, where each of the SRS resources comprises a number of SRS ports. This indication can be used by the network to determine how many beams a UE needs for good angular coverage and to determine how many layers the UE can transmit in a similar direction, for example. The indication can also be used to determine how many layers it can transmit from a UE panel.

The UE in some embodiments also indicates groups of SRS resources, where each SRS in a group may not be transmitted simultaneously, but SRS resources in different groups may be transmitted simultaneously. The network can use this information to determine which transmit chains the UE can simultaneously transmit on.

In some embodiments, the UE then receives an indication of at least one SRS resource that it should use to determine the precoding for PUSCH. The UE should apply the same precoder or analog beamformer as it used for each SRS port in the selected SRS resource to form a virtualized array of elements carrying PUSCH, where the virtualized array has the same number of virtualized antennas for PUSCH as in the indicated SRS resource. In some embodiments, the UE may further receive a TPMI indicating a precoder it should use to combine the virtualized elements, thereby allowing coherent combining of PUSCH antenna elements corresponding to the SRS ports within the selected SRS resource.

Finally, the UE in some of these embodiments transmits PUSCH using the precoding and/or analog beamforming determined from the selected SRS and/or TPMI.

According to some aspects of the techniques disclosed herein, a UE adapted to transmit on different antenna subsets transmits an indication that the UE can transmit a number of distinct RS resources, where each of the RS resources comprises at least one RS port. The UE transmits capability information indicating that the UE is capable of transmitting simultaneously on multiple RS resources and/or receives first and second RS configurations, where the first RS configuration is a first list of SRS resources that at least correspond to RS resource indications used for PUSCH transmission, and the second RS configuration is a second list of RS resources that may be used for SRS transmission. The UE receives an indication of at least one RS resource and transmits a physical channel on antennas of the UE associated with the indicated RS resources.

According to some embodiments, a method in a UE of transmitting on different antenna subsets in the UE includes transmitting an indication that the UE can transmit a number of distinct. RS resources, where each of the RS resources comprises a number of RS ports. The method includes transmitting an indication of which RS resources the UE can transmit on simultaneously. The method further includes receiving an indication of at least one RS resource and transmitting a physical channel on antennas of the UE associated with the indicated at least one RS resource.

In some embodiments, the UE indicates that it cannot control the relative phase between antenna ports corresponding to different SRS resources while it transmits on the antenna ports. The UE may then receive an indication of a plurality of SRS resources, and then transmit one modulation symbol on an antenna corresponding to one of the SRS resources, and a different modulation symbol on a different antenna corresponding to a second of the SRS resources. In this way, non-coherent MIMO transmission with different MIMO layers on different antenna subsets can be supported in UEs that do not support coherent combining of all of their transmit chains.

In some related embodiments, a UE receives multiple TPMIs, where each TPMI corresponds to one of the plurality of SRS resources and indicates a precoder to be applied to combine the virtualized PUSCH antenna elements corresponding to each SRS port in each of the SRS resources. In this way, coherent MIMO transmission can be used on transmit chains corresponding to an SRS resource while non-coherent MIMO transmission with different MIMO layers is used for different antenna subsets corresponding to different SRS resources.

With the techniques and devices described herein, UEs with analog beamforming and multiple TX chains can transmit on all TX chains. UEs that support coherent combining of different analog beams can transmit a MIMO layer on different analog beams. UEs that do not support coherent combining of analog beams can transmit different MIMO layers on different analog beams.

According to some embodiments, a method, in a network node of a wireless network, of receiving transmissions from a UE on different antenna subsets in the UE, includes receiving an indication that the UE can transmit a number of distinct RS resources, where each of the RS resources comprises a number of RS ports. The method also includes receiving an indication of which RS resources the UE can transmit on simultaneously and selecting at least one RS resource, based on the received indications. The method further includes transmitting an indication of the selected at least one RS resource to the UE and receiving a physical channel transmitted by the UE on antennas of the UE associated with the indicated at least one RS resource.

According to some embodiments, a method, in a network node of a wireless network, of receiving transmissions from a UE on different antenna subsets in the UE, includes receiving an indication that the UE can transmit a number of distinct RS resources, where each of the RS resources comprises at least one RS port. This method further includes receiving capability information that indicates that the UE is capable of transmitting simultaneously on multiple RS resources and/or sending the UE a first and a second RS configuration, wherein the first RS configuration is a first list of SRS resources that at least correspond to RS resource indications used for PUSCH transmission, and the second RS configuration is a second list of RS resources that may be used for SRS transmission, and/or sending the UE a transmission request, where the transmission request is constructed by the network node to avoid instructing the UE to transmit SRS resources that the UE cannot transmit simultaneously. This method still further includes selecting at least one RS resource, based on the received indications, transmitting an indication of the selected at least one RS resource to the UE, and receiving a physical channel transmitted by the UE on antennas of the UE associated with the indicated at least one RS resource.

According to some embodiments, a UE adapted to transmit on different antenna subsets in the UE includes a transceiver circuit, a processor operatively coupled to the transceiver circuit and a memory coupled to the processing circuit, the memory storing instructions for execution by the to processor, whereby the processor is configured to control the transceiver circuit. The transceiver circuit is controlled to transmit an indication that the UE can transmit a number of distinct RS resources, where each of the RS resources comprises a number of RS ports and transmit an indication of which RS resources the UE can transmit on simultaneously. The transceiver circuit is also controlled to receive an indication of at least one RS resource and transmit a physical channel on antennas of the UE associated with the indicated at least one RS resource.

According to some embodiments, a network node of a wireless network adapted to receive transmissions from a UE on different antenna subsets in the UE includes a transceiver circuit, a processor operatively coupled to the transceiver circuit and a memory coupled to the processing circuit, the memory storing instructions for execution by the processor, whereby the processor is configured to control the transceiver circuit. The transceiver circuit is controlled to receive an indication that the UE can transmit a number of distinct RS resources, where each of the RS resources comprises a number of RS ports. The transceiver circuit is also controlled to receive an indication of which RS resources the UE can transmit on simultaneously and select at least one RS resource, based on the received indications.

The transceiver circuit is controlled to transmit an indication of the selected at least one RS resource to the UE and receive a physical channel transmitted by the UE on antennas of the UE associated with the indicated at least one RS resource.

Further embodiments may include apparatuses, computer program products and non-transitory computer readable media that store instructions that, when executed by processing circuit, perform the operations of the embodiments describe above.

DETAILED DESCRIPTION

Multiple SRI Based PUSCH Transmission

As discussed above, a UE may be instructed to transmit PUSCH using multiple SRI, and such transmission may be done coherently or non-coherently. In order for a TRP or gNB to associate a given SRI with a UE effective antenna pattern, an eNB (or gNB, or other base station or access point) should know how many effective antenna patterns are needed by the UE, and furthermore how many antenna ports the UE must simultaneously transmit using the same effective antenna pattern.

Figure 6:
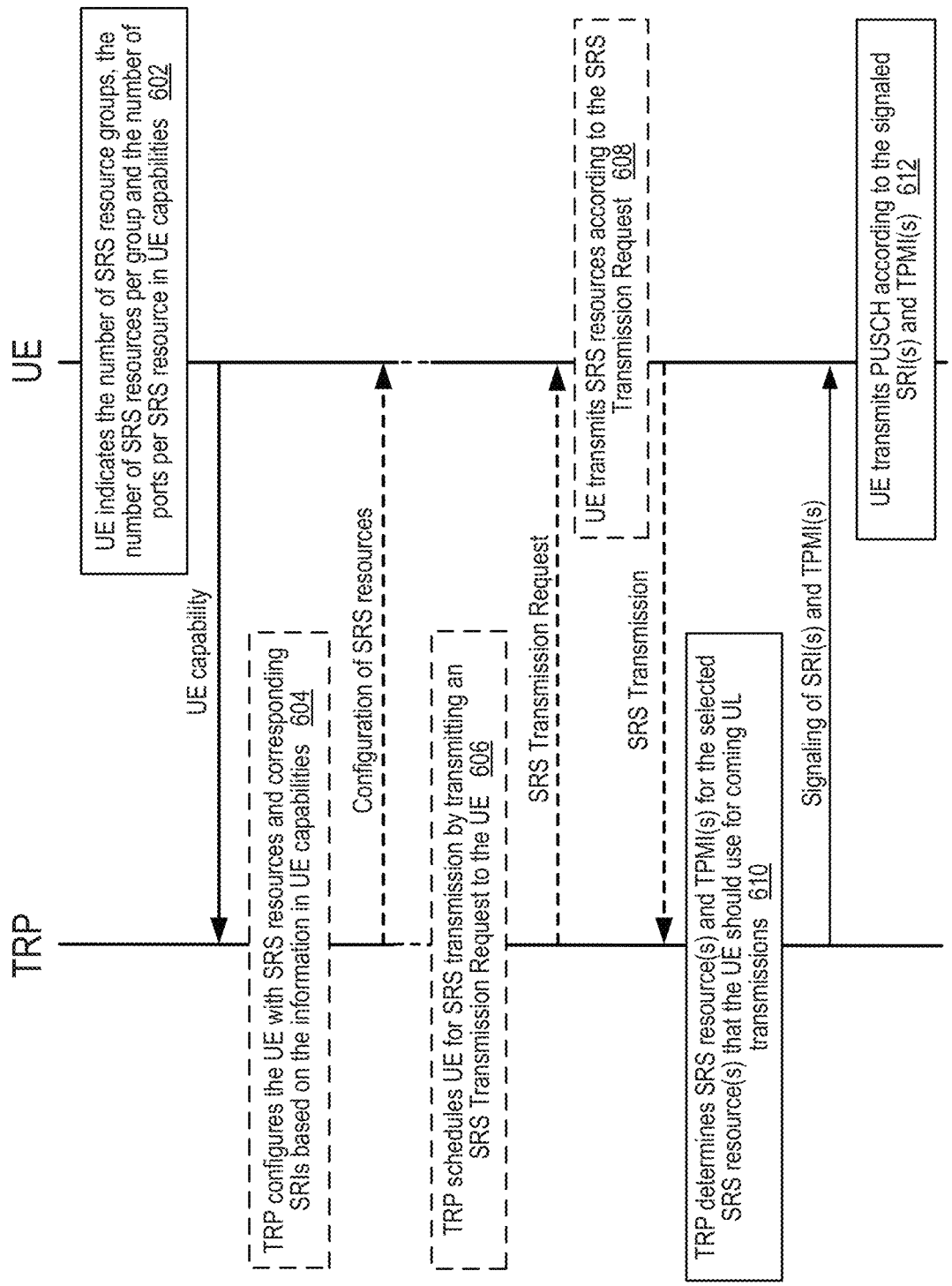
FIG. 6 is a process and signal flow diagram illustrating an example technique according to some embodiments of the present invention.

FIG. 6 illustrates a flow chart that summarizes some embodiments of techniques described herein for addressing these issues. In the figure, as in the rest of the present document, the term "UE" may be understood to refer to any wireless device that supports the transmission of SRS on multiple SRS resources, while the term "TRP" may correspond to a particular eNB, gNB, access point, or other transmission point, or to a controller for one or more transmission points. Likewise, the term "gNB," which is commonly used to describe the base stations in NR, should be understood here to refer more generally to refer to any base station, access point, or transmission point.

In the first step shown in FIG. 6, the UE transmits information regarding how many SRS resources the UE would like to use, how many SRS resources can be transmitted simultaneously, and the number of ports per SRS resource (block 602). This may comprise indicating the number of SRS resource groups, the number of SRS resources per group, and the number of SRS ports per SRS resource. In some embodiments, this step includes an indication of which SRS resources may be transmitted simultaneously by the UE. In some embodiments described in more detail below, the SRS resources that can be transmitted simultaneously can be determined using a fixed mapping based on the number of SRS resource groups and the number of SRS resources per group. In other embodiments, more parameters are used to identify the SRS resources that may be transmitted simultaneously. In general, this step can be done in many different ways, as will be described in more detail below.

In the next step shown in FIG. 6, the TRP defines, based on the information on UE capabilities received in the first step, the SRS resources that should be used for the UE and signals this information to the UE (block 604). This may comprise configuring the UE with SRS resources and corresponding SRIs based on the information in UE capabilities.

Whenever the UE should be scheduled for UL transmission, the TRP starts with transmitting an SRS Transmission Request to the UE, informing the UE which SRS resources should be transmitted (block 606). Based on the earlier configuration of SRS resources, the UE can directly map each SRS resource to a certain beam of a certain transmission chain. The TRP may use the indication of which SRS resources can be transmitted simultaneously by the UE to avoid instructing the UE to simultaneously transmit SRS resources that it cannot transmit simultaneously.

In the next step, the UE transmits the SRS resources (block 608) and the TRP measures on them and determines preferred SRS resource(s) and corresponding TPMI(s) for coming UL transmissions (block 610). The TRP then signals the SRI(s) and TPMI(s) to the UE and the UE applies them for the coming PUSCH transmission (block 612). Note that the arrows and textboxes with dashed line are optional elements, in that they need not necessarily appear in every implementation or in every instance of the illustrated method.

UE Capability for SRS Resource and PUSCH Transmission

Here, mechanisms for indicating UE capability for SRS resource and PUSCH transmission are described. These mechanisms may be understood through the example configuration of FIG. 5, where analog beamforming is used on 4 transmit chains, with 2 transmit chains per 'panel', and the panels covering different directions. Of course, the mechanisms here can be generalized to cover any number of "panels," or sets of transmit chains that, with any number of transmit chains per set.

Figure 1:
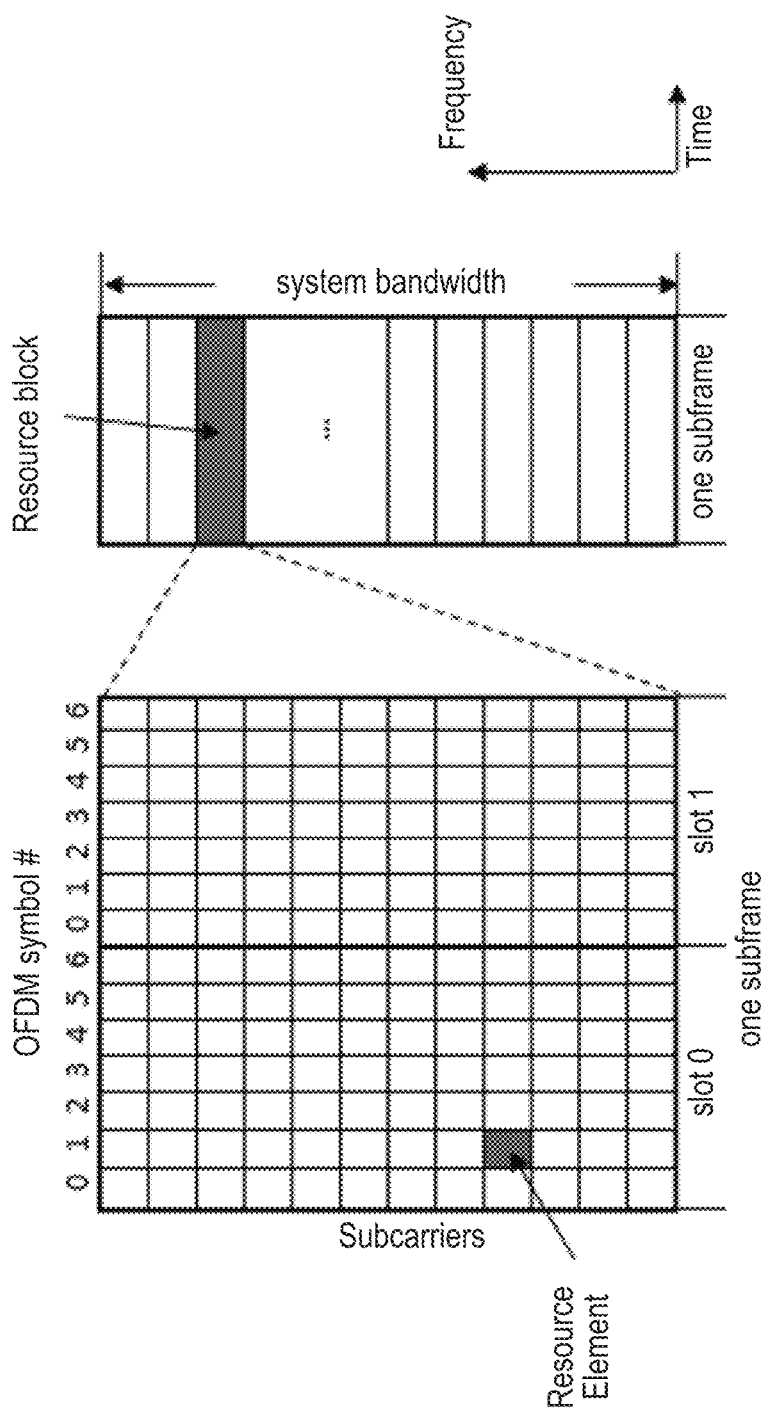
FIG. 1 illustrates the basic NR physical resources.
Figure 2:
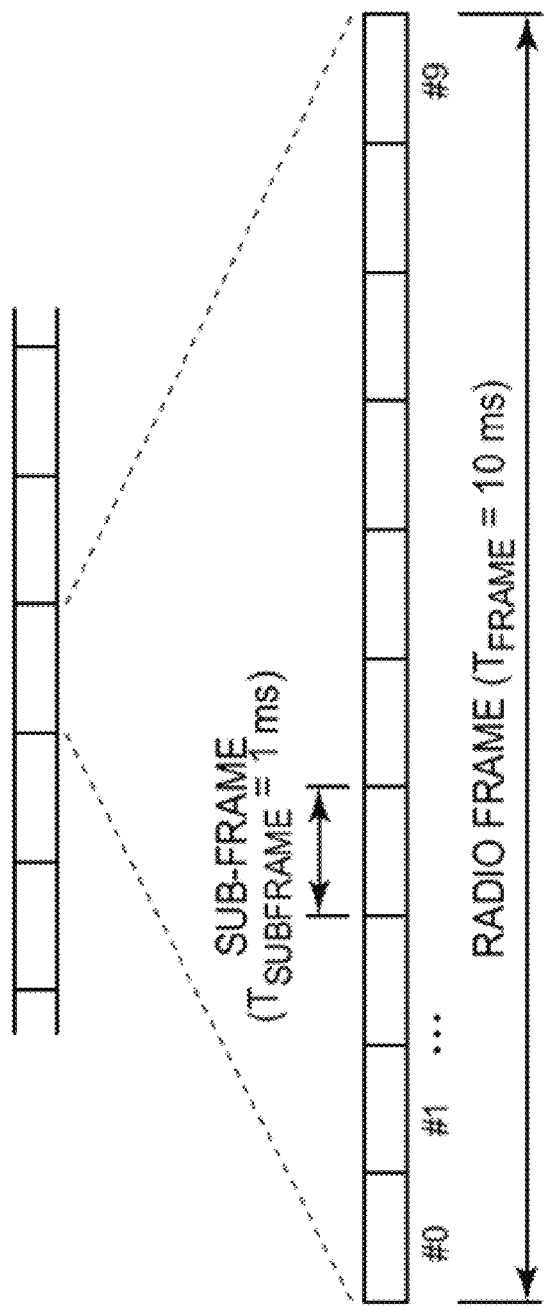
FIG. 2 shows the LTE time-domain structure with 15-kHz subcarrier spacing.
Figure 3:
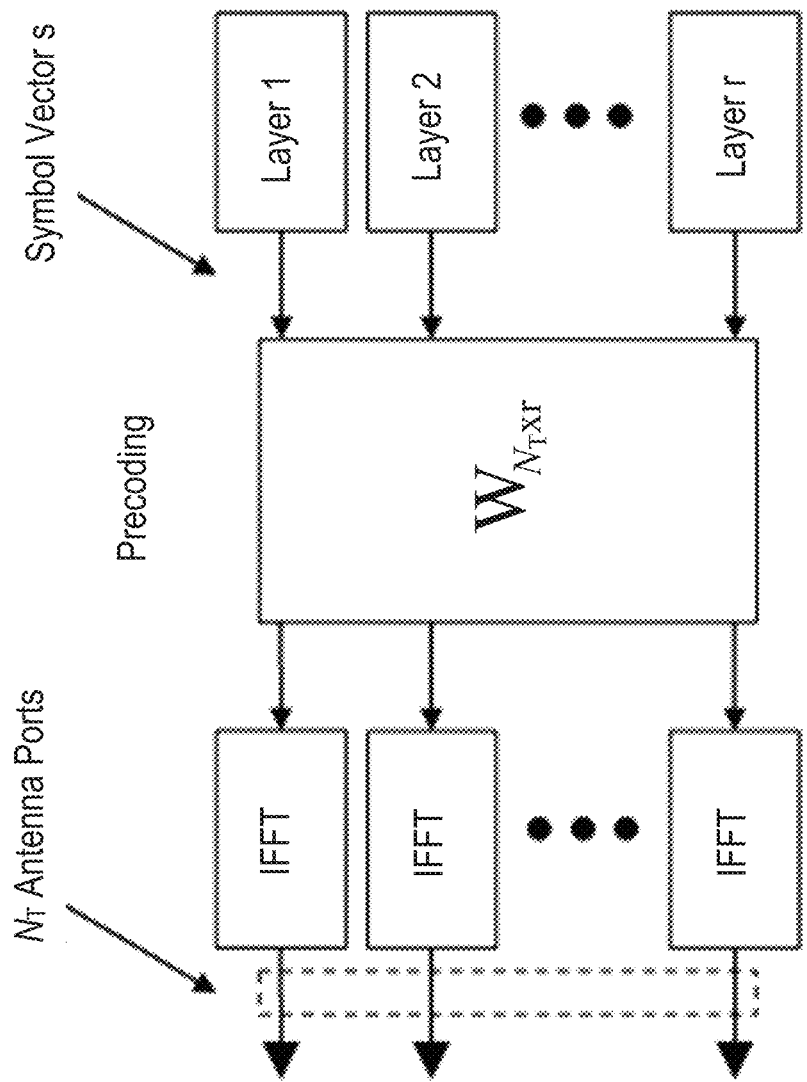
FIG. 3 illustrates the transmission structure of precoded spatial multiplexing in NR.
Figure 4:
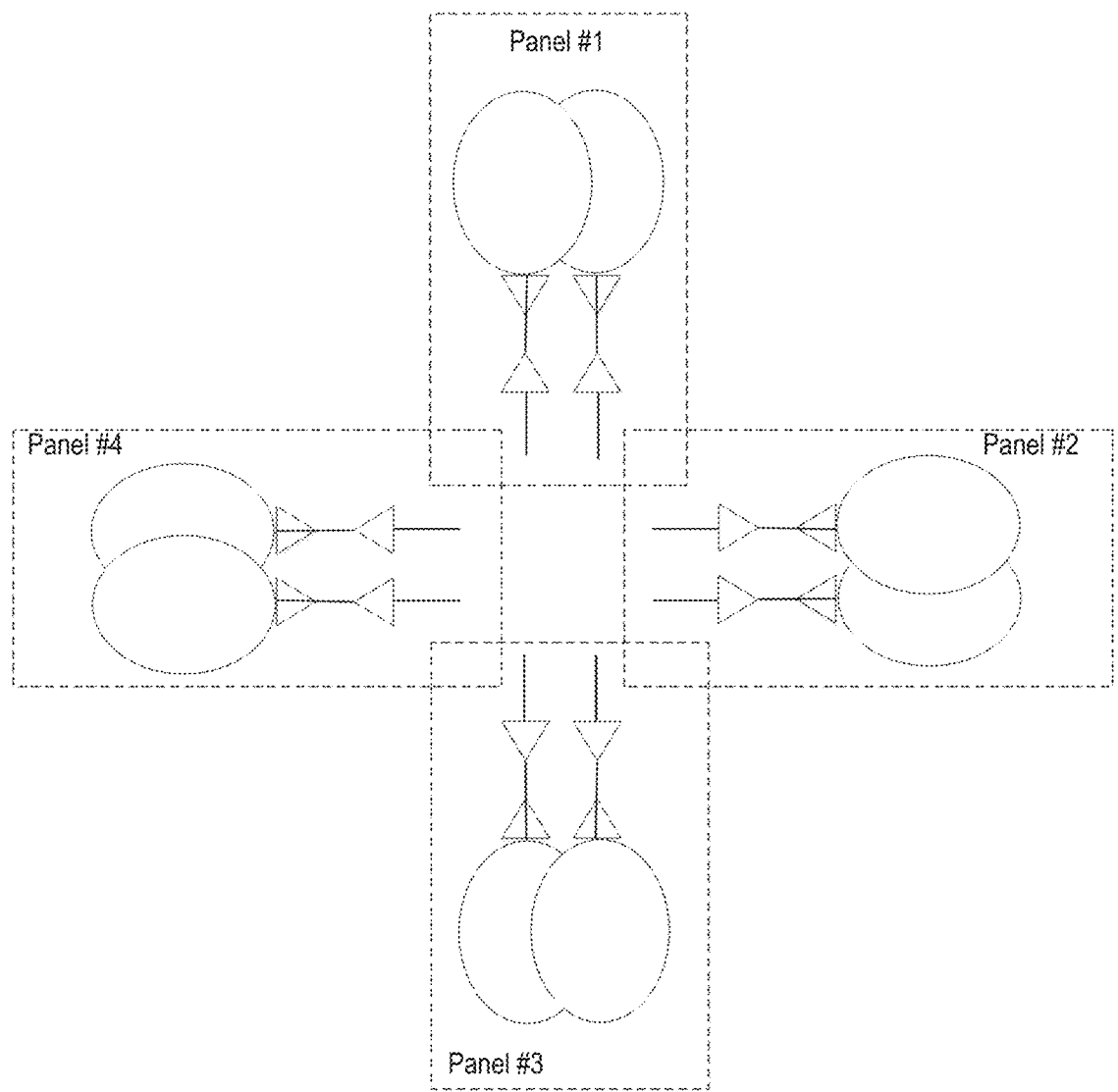
FIG. 4 illustrates an example 4-panel, 8-element UE antenna array.
Figure 5:
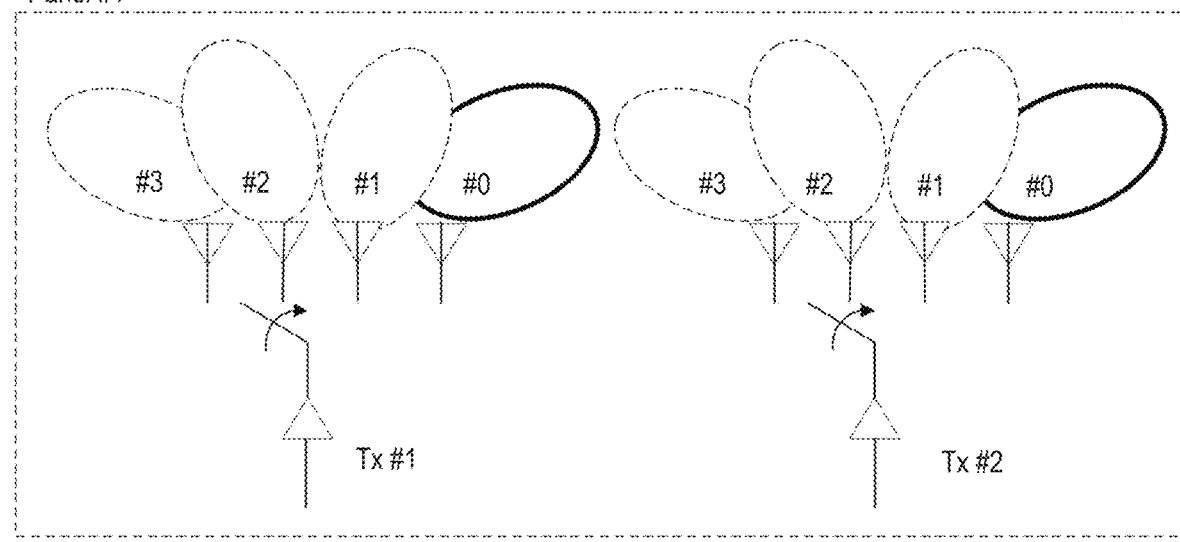
FIG. 5 illustrates an example two-panel with four distinct effective antenna patterns per panel.
Figure 5:
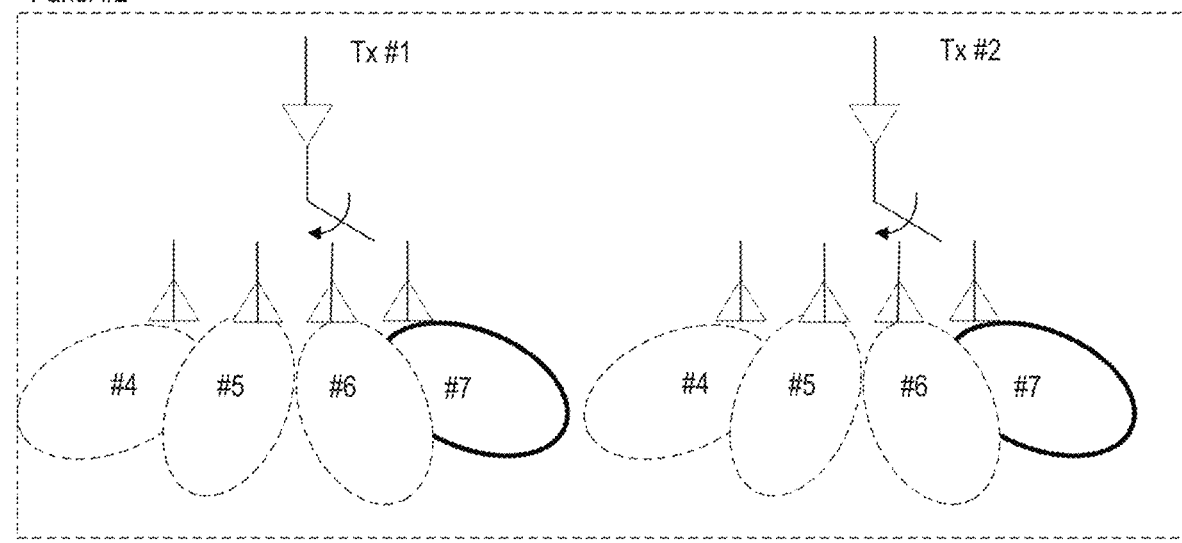

In the example shown in FIG. 5, since there are 4 unique beams per panel (given that each transmit chain in a panel uses the same 4 beam boresights as the other transmit chain in the same panel), the UE then has 8 unique beams it can produce. These are numbered 0 to 7 in the figure. Since each beam could be received at a different power level by the TRP, the TRP should be informed of this total number of beams (or more generally, effective antenna patterns) that the UE can produce. One way to do this is for the UE to indicate to the TRP that the UE can support (or alternatively requires) 8 SRS resources as a UE capability. In general, the number of SRS resources in the UE capability can reflect cases where there are a different number of beams per panel, in which case the number of SRS resources is just the sum of all SRS resources needed for each panel, that is, the number of distinct beams each panel can produce or that is needed to provide sufficient angular coverage for the beams in the panel. In some cases, the UE may have overlapping beams across panels, and so a given beam direction may be used only in one panel, and the total number of SRS resources in the UE capability would be the number of sufficiently non-overlapping beams.

To continue the example, let us assume that 8 SRS resources, each with 2 SRS ports corresponding to each of the transmit chains in one of the panels, are then configured for the UE. If the TRP wishes the UE to transmit on all TX chains, it must know which SRS resources correspond to each TX chain. This may be identified equivalently through which SRS resources can be transmitted simultaneously by the UE.

In an embodiment, suitable for where a single number of beams per panel is supported by the UE, which SRS resources may be transmitted simultaneously is determined by a rule based on the number of SRS resources that are associated with each panel. In a two-panel example, SRS resources with indices $0 \ldots N-1$ are implicitly transmitted on panel #1, while SRS resources with indices $N_b \ldots 2*N_b-1$ are for panel #2, where $N_b$ is the number of beams (or equivalently SRS resources) per panel (and $N_b=4$ in the example of FIG. 5). More generally, where two panels have the same number of beams $N_b$, two SRS resource indices $k_1$ and $k_2$ can be assumed by the TRP to be able to be transmitted simultaneously, for example in the same OFDM symbol, if $\lfloor k_1/N_b \rfloor \neq \lfloor k_2/N_b \rfloor$. If more than a pair of SRS resources is to be simultaneously transmitted, then the rule $\lfloor k_i/N_b \rfloor \neq \lfloor k_j/N_b \rfloor$ is used to determine whether all SRS resources can be simultaneously transmitted, where $k_i$ and $k_j$ are the $i^{th}$ and $j^{th}$ SRS resource indices to be paired, and all pairwise combination of SRS resources to be simultaneously transmitted must satisfy the rule. The SRS resources that cannot be transmitted together may be labeled "SRS resource groups" or "SRS resource sets", while the quantity $N_b$ may alternatively be identified as the number of SRS resources in an SRS resource group or set. Therefore, for example, the SRS resource indices $0 \ldots N_b-1$ and $N_b \ldots 2*N_b-1$ may be considered to be in a first and a second SRS resource group.

The SRS resource indexing used to determine which SRS resources can be transmitted simultaneously or which SRSs to transmit on the uplink may not be the same as the indexing used for SRI that indicates how PUSCH is to be transmitted. This is because the set of SRS resources that may be transmitted by a UE generally larger than the number of SRS that a UE will be configured with for PUSCH transmission at any given point in time. Configuring UE to transmit PUSCH using a subset of all SRS resources that it can transmit allows fewer SRI bits to be used to signal the subset rather than the whole set of possible SRS resources. Therefore, in some embodiments, a UE is configured with a first list of SRS resources that correspond to SRS resource indications used for PUSCH transmission (SRIs), and with a second list of SRS resources that the UE may transmit SRS on.

In some embodiments, the number of beams per panel may be different. Assuming panel k (or equivalently SRS resource group k) utilizes $N_{b,k}$ beams (or equivalently SRS resources), SRS resources $0, \ldots, N_{b,1}-1$ is implicitly associated with panel #1 and cannot be transmitted simultaneously while SRS resources $N_{b,1}, \ldots, N_{b,1}+N_{b,2}-1$ is associated with panel #2 and cannot be transmitted simultaneously, and so forth.

In other embodiments, suitable for where a different number of beams may be supported for each panel by the UE, which SRS resources may be transmitted simultaneously can be configured per panel. Multiple lists of SRS resources are constructed, where each list comprises a set of SRS resources that may not be transmitted simultaneously. All other combinations of SRS resources can be transmitted simultaneously. Each list of these SRS resources could correspond to the beams in each panel that cannot be transmitted simultaneously, for example analog beams that are selected for each panel. The lists need not be the exact same length or may not identify the same number of beams that cannot be simultaneously transmitted, which allows different numbers of beams to be associated with each list, and therefore each panel. In an embodiment, each list with index l comprises a bitmap of length $N_{b,max}$, and bit with index in in list l corresponds to SRS resource k, where $k=lN_{b,max}+m$ and k, l, and m are integers with a minimum value of zero. The quantity $N_{b,max}$ may alternatively be identified as the maximum number of SRS resources in each SRS resource list, and each SRS resource list may be identified as an 'SRS resource group' or an 'SRS resource set'.

An example of the use of these latter embodiments can be illustrated using the UE configuration of FIG. 7 below, where panel #1 supports 4 beams, but panel #2 has 2 beams, Two lists would be needed (one for each panel), where the first and second lists are represented as {1111} and {1100}, respectively. SRS resources $k \in \{0, 1, 2, 3\}$ could not be transmitted simultaneously and would be associated with the first list (and panel), while SRS resources $k \in \{4, 5\}$ could not be transmitted simultaneously and would be associated with the second list (and panel), In a variant of the previous embodiments, each list comprises a bitmap of $K_{max}$ bits, where $K_{max}$ is the total number of SRS resources and each bit corresponds to an SRS resource. For the UE configuration in FIG. 7, the two lists defining which resources may not be transmitted simultaneously would be represented by {111100} and {000011}, respectively.

Figure 7:
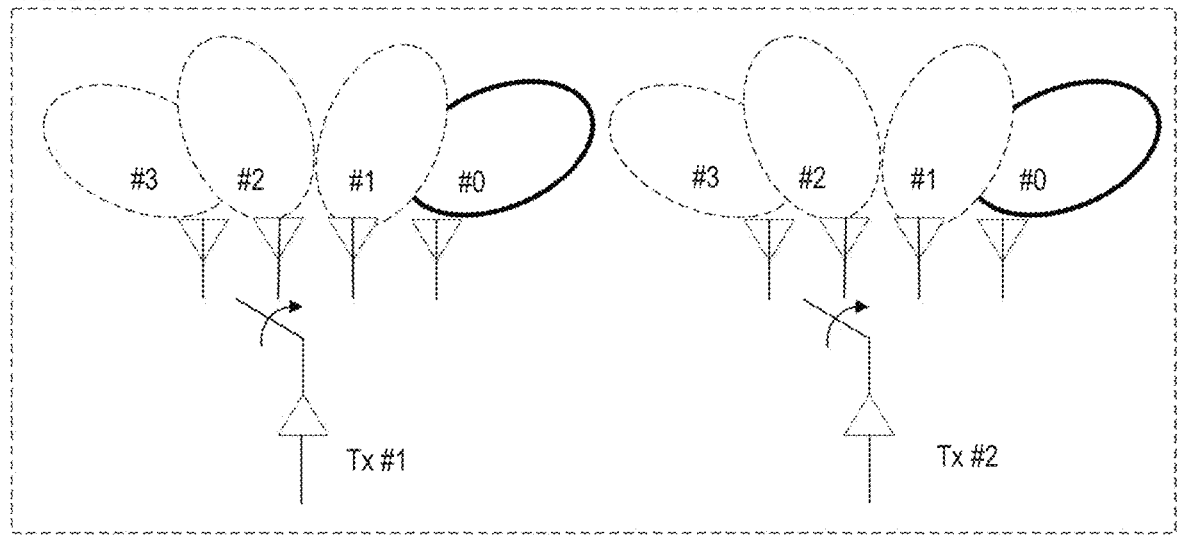
FIG. 7 illustrates a UE supporting a different number of SRS resources per panel.
Figure 7:
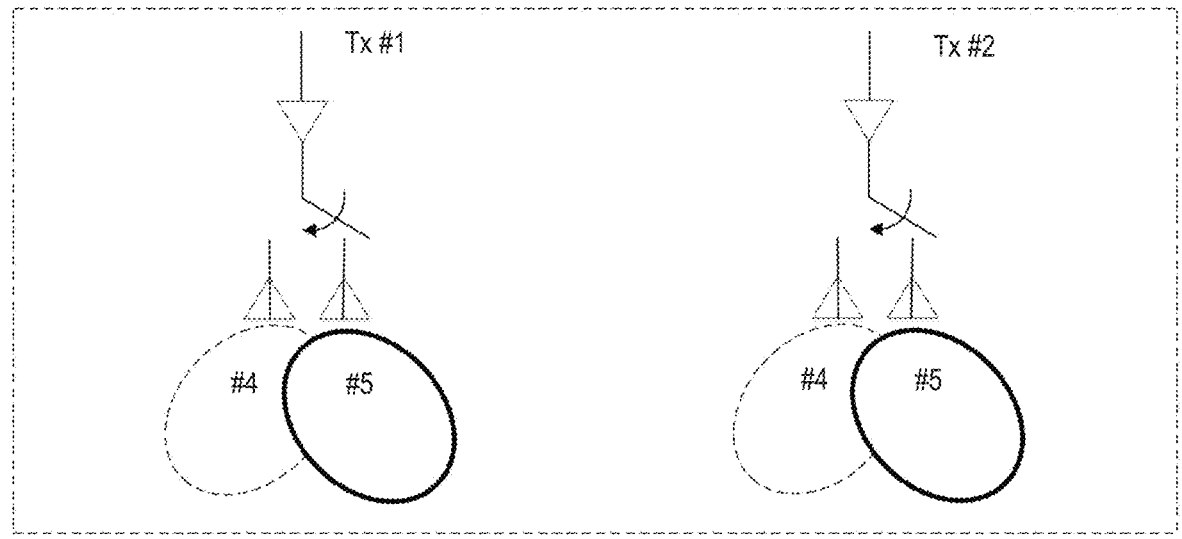

In yet another variant of the previous embodiments connected to FIG. 7, the signaling is instead done by signaling the resources may not be transmitted simultaneously by signaling {4, 2}, meaning that SRS resources $k \in \{0, 1, 2, 3\}$ could not be transmitted simultaneously and while SRS resources $k \in \{4, 5\}$ could not be transmitted simultaneously. The order of this signaling may thus be important and used to tag the individual SRS resources; the signaling {4, 2} could be translated to the list:

SRS resource index 0: panel 1, beam 0 within panel,
  SRS resource index 1: panel 1, beam 1 within panel,
  SRS resource index 2: panel 1, beam 2 within panel,
  SRS resource index 3: panel 1, beam 3 within panel,
  SRS resource index 4: panel 1, beam 0 within panel,
  SRS resource index 5: panel 1, beam 1 within panel.

Thus, any gNB signaling in order to indicate a certain beam could utilizing this indexing. Based on the UE capability signaling {4, 2} it also implicitly implies an SRS resource index to beam mapping. This mapping may, for instance, make it clear that $SRI \in \{0, 1, 2, 3\}$ corresponds to panel 1 whereas $SRI \in 51$ corresponds to panel 2. For the more general case $\{N1, N2, \ldots, N_q\}$, it would imply that SRS resource indexes 0, N1-1 corresponds to N1 beams from panel 1, the next N2 SRS resource indexes corresponds to N2 beams from panel 2, etc.

In other embodiments, suitable for where any SRS resource can be associated with any panel, a list of all possible combinations of SRS resources for a given number panels (or equivalently SRS resource groups, SRS resource group sets) is used to identify which combinations of SRS resources may be transmitted. The list of allowed SRS resource combinations is generated as a combinatorial index r defined as:

$$r = \sum_{i=0}^{N_p-1} \left\{ \begin{array}{c} N_{b,tot} - s_i \\ N_p - i \end{array} \right\}$$

where $\{s_i\}_{i=0}^{N_p-1}$ is a set of length $N_p$, that contains the sorted SRS resource indices $s_i$ that may be transmitted together, such that $(1 \leq s_i \leq N_{b,tot}, s_i < s_{i+1})$ and where $$\left\{ \begin{array}{c} x \\ y \end{array} \right\} = \begin{cases} \begin{pmatrix} x \\ y \end{pmatrix} & x \geq y \\ 0 & x < y \end{cases}$$

is the extended binomial coefficient, resulting in unique label $$r = \left\{ 0, \ldots, \begin{pmatrix} N_{b,tot} \\ N_p \end{pmatrix} - 1 \right\},$$

where $N_p$ is the number of SRS resource lists (or equivalently the number of, panels, SRS resource sets, or SRS groups), and $N_{b,tot}$ is a total number of SRS resources allocated to the UE that may be selected from for SRS transmission. Note for clarity that here the SRS resource indices $s_i$ have a minimum value of 1 and a maximum value of $N_b$, whereas other embodiments have SRS indices starting with zero.

As discussed above, a UL MIMO capable UE may not be capable of transmitting coherently between some or all of its Tx chains, and the TRP should be aware of this limitation. In the simplest case, the UE cannot transmit coherently among any group of its Tx chains. Such a UE could indicate that it cannot transmit coherently on any combination of transmit chains. In an embodiment, this indication that it cannot transmit coherently on any transmit chain can be identified when the UL MIMO capable UE does not indicate it can support relative phase continuity between Tx chains.

It is also possible that a UE could support coherent transmission on Tx chains within a panel, but not across panels. In an embodiment, such a UE indicates which SRS resources can be jointly transmitted coherently by indicating if it can coherently transmit PUSCH DMRS antenna ports corresponding to SRS resources that are in different SRS resource lists (or equivalently different panels, SRS resource sets, or SRS groups) in addition to PUSCH DMRS antenna ports corresponding to SRS ports that are in each of its SRS resources. Such an indication can be that it supports relative phase continuity between all SRS resources corresponding to different SRS resource lists (or equivalently different panels, SRS resource sets, or SRS groups).

In other cases, a UE may be able to transmit coherently only between some of its panels. Therefore, in another embodiment, a UE indicates that it can coherently transmit PUSCH DMRS antenna ports corresponding to SRS resources among subsets of SRS resource lists (or equivalently subsets of panels, SRS resource sets, or SRS groups) in addition to PUSCH DMRS antenna ports corresponding to SRS resources that are in each of its SRS resources. Such an indication can be that it supports relative phase continuity between a set of lists of SRS resources (or equivalently different panels, SRS resource sets, or SRS groups). The set of lists of SRS resources can be identified by a bitmap of coherent SRS resource lists of, the bitmap being of length $N_p$, where $N_p$ is the number of SRS resource lists (or equivalently the number of, panels, SRS resource sets, or SRS groups). A '1' in the bitmap of coherent SRS resource lists, for example, indicates that all the PUSCH DMRS ports associated with SRS resources in the corresponding SRS resource list can be coherently transmitted with other DMRS ports associated with SRS resources in the coherent SRS resource list that also have a '1' in the bitmap. A '0' in the bitmap of coherent SRS resource lists indicates that all the PUSCH DMRS ports associated with SRS resources in the corresponding SRS resource list cannot be coherently transmitted with any other PUSCH DMRS ports.

In some embodiments, the DCI Format comprising the UL grant scheduling a PUSCH transmission is dimensioned according to the indicated UE capability for SRS resources. For example, as SRS resources in an SRS resource list, according to some embodiments, cannot be simultaneously transmitted, at most one SRS resource per SRS resource list (or equivalently SRS resource group) can be indicated in the form of an SRI in the DCI scheduling the PUSCH. Therefore, in one embodiment, the SRI indication field comprises $N_p$ subfields where each subfield $k=1, \ldots, N_p$ comprises $\log_2\lceil 1+N_{b,k} \rceil$ bits. Each subfield is associated with an SRS resource list (or equivalently SRS resource group) comprising $N_{b,k}$ SRS resources that cannot be simultaneously transmitted. Each codepoint in the bitfield indicates an SRS resource in the list, or, that no SRS resource in the list is used.

Uplink Antenna Subset Transmission

When a UE is configured to be able to transmit using multiple SRI, the SRS resources can be associated with different Tx chains, and therefore a subset of the UE's antennas. If there are multiple SRS ports in the SRS resource, the TRP could use the SRS ports to determine a TPMI that identifies a precoder to use on the antenna subset for PUSCH transmission. Consequently, each SRS resource, and optionally each would correspond to a different subset of the UE antennas. Therefore, in an embodiment, when a UE is signaled with one SRI, it transmits a physical channel such as the PUSCH using the precoders indicated icy TPMI on antennas of the UE associated with the signaled SRS resource.

In some embodiments supporting multiple SRIs, when a UE further indicates that each of a combination of SRS resources can be transmitted simultaneously and it is signaled a plurality of SRIs that can be transmitted simultaneously, it transmits simultaneously on multiple subsets of its antennas. In some related embodiments, where the UE can further transmit coherently PUSCH on antennas corresponding to the SRS resources, the UE may be signaled a single TPMI that identifies a single precoder or precoder matrix to apply on PUSCH on all antennas corresponding to the multiple SRIs it is signaled. In other related embodiments where the UE further cannot transmit coherently PUSCH on antennas corresponding to the SRS resources, the UE transmits different modulation symbols, and therefore different MIMO layers, on the different antenna subsets corresponding to the signaled SRIs. In a similar embodiment where the UE cannot transmit coherently, the UE may be signaled a single TPMI for each SRS resource that identifies a single precoder or precoder matrix to apply on PUSCH on the subset of antennas corresponding to each of the multiple SRIs it is signaled.

Uplink Power Control

Since different panels may be directed in different direction, the propagation environment they experience may potentially be quite different. It may also be that they are transmitting to different TRPs in a multi-TRP transmission. In some embodiments of the invention, UL power control is therefore connected to the panel. Hence, returning to the previous embodiment in FIG. 7, where analog beamforming is used on 4 transmit chains, with 2 transmit chains per "panel," and the panels covering different directions that the UE may connect its power control to the panel. Hence, if for instance the power control is based on CSI-RS the UE may be configured with two different CSI-RSs and then base the power control from panel 1 from $CSI-RS_1$ whereas the power control for panel 2 is based on $CSI-RS_2$. In this way the open loop part of the power control will be panel specific since the path loss estimation for the power control is panel specific. Furthermore, for power control a set of parameters are usually configured (alpha, $P_0$ etc.) and they may then be configured per panel based on the signaled UE capability.

In other embodiments, two separate power control loops are used but the path loss estimation is based on the same CSI-RS. In still other embodiments, the path loss is instead based on a synchronization signal (SS).

In some embodiments, the closed loop power control is done per panel by transmitting a TPC command per panel. In such cases, either or both of the SRS and PUSCH power transmitted from a panel may be used for uplink power measurement and both SRS and PUSCH may have their transmit power controlled by a TPC command. The power control command for each panel may therefore be associated with an SRS resource, and in some embodiments, an SRS resource group or list.

In some related embodiments with per panel power control, when a UE is indicated multiple SRI, it transmits using power levels corresponding to each of the power control commands, which in turn correspond to each of the SRS resources. Since SRS resources, groups, or lists can correspond to subsets of the UE antennas, when multiple SRIs are indicated, the power control commands can be used to set the power in different antenna subsets differently when transmitting simultaneously on the different antenna subsets. This can have the advantage of allowing different amplitude weighting on antenna elements even when the codebook associated with the TPMI has only unit magnitude weights. Such unequally weighted antenna arrays can have improved performance.

In some embodiments, the PHR (power headroom report) is reported per panel.

Figure 8:
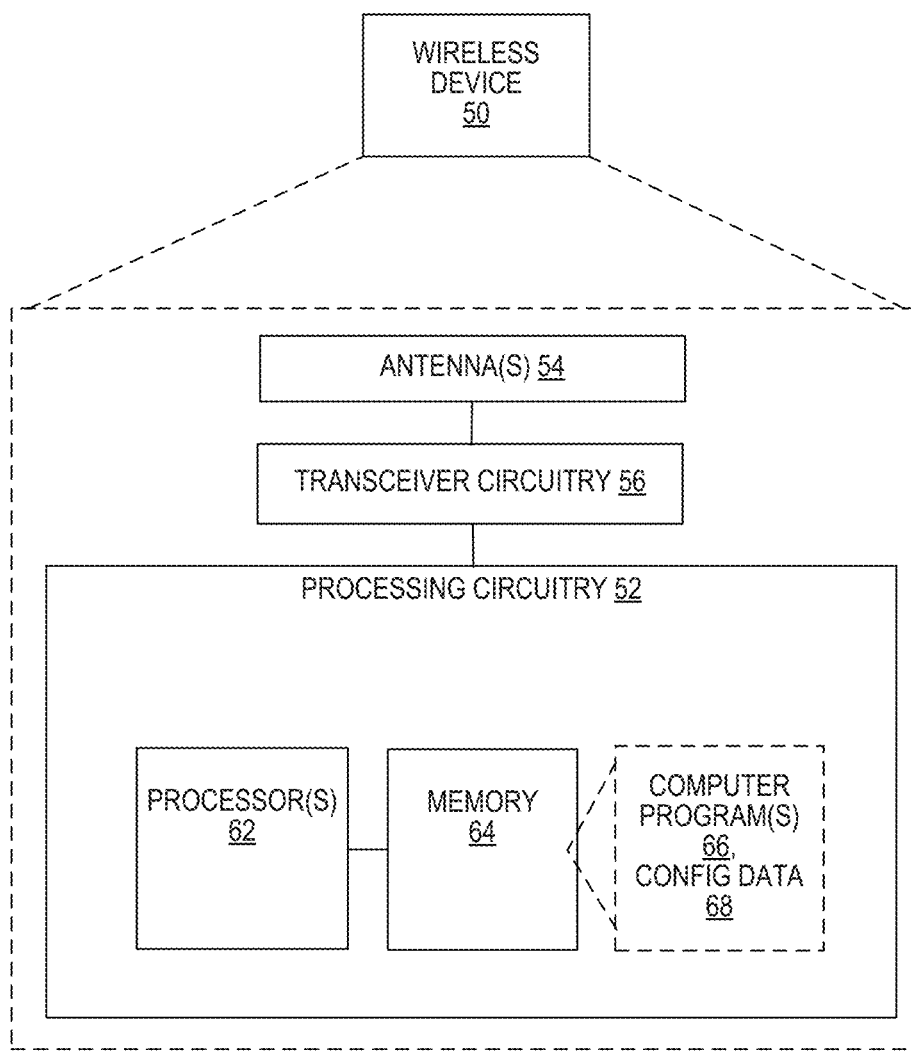
FIG. 8 illustrates an example UE.

FIG. 8 illustrates a block diagram of a wireless device 50 in a wireless communication system (e.g., a cellular communications system) in which embodiments of the present disclosure may be implemented. The wireless device 50 may be a UE. The term "UE" is used herein in its broad sense to mean any wireless device. As such, the terms "wireless device" and "UE" may be used interchangeably herein. In general, the wireless device 50 may additionally represent a target device, a D2D UE, a machine type UE, or a UE capable of Machine-to-Machine (M2M) communication, a sensor equipped with a UE, an iPAD, a tablet, a mobile terminal, a smart phone, Laptop Embedded Equipped (LEE), Laptop Mounted Equipment (LME), Universal Serial Bus (USB) dangles, Customer Premises Equipment (CPE), an IoT (Internet of Things) capable device, or any other device capable of communicating with a 5G and/or NR network, etc.

As illustrated in FIG. 8, the wireless device 50 includes processing circuitry 52 comprising one or more processors 62 (e.g., Central Processing Units (CPUs), Application Specific Integrated. Circuits (ASICs), Field Programmable Gate Arrays (FPGAs), and/or the like) and a memory 64 that stores computer programs 68 and, optionally, configuration data 68. The wireless device 50 also includes transceiver circuitry 56, including one or more transmitters or receivers coupled to one or more antennas 54. In some embodiments, the functionality of the wireless device 50 described above may be fully or partially implemented in software (e.g., computer programs 66) that is stored in the memory 64 and executed by the processor(s) 62.

In some embodiments, a carrier containing the computer program products described herein is provided. The carrier is one of an electronic signal, an optical signal, a radio signal, or a computer readable storage medium (e.g., a non-transitory computer readable medium such as memory).

In some embodiments, a computer program including instructions which, when executed by at least one processor, causes the at least one processor of the wireless device 50 to carry out any of the UE-related techniques described herein.

Figure 9:
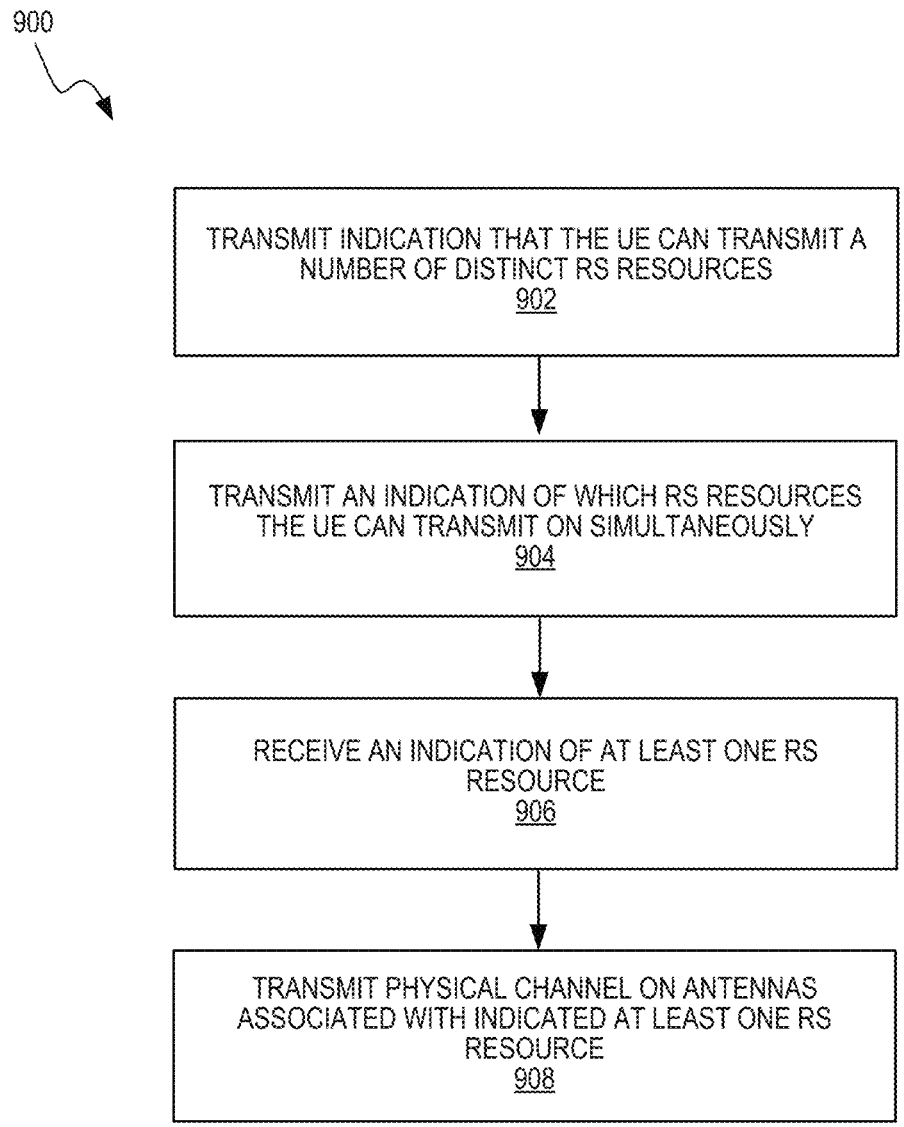
FIG. 9 is a process flow diagram illustrating an example method according to some embodiments.

Wireless device 50 (e.g., UE) or a similar wireless device may be configured, for example, to perform the method 900 shown in FIG. 9. The method 900 includes transmitting an indication that the UE can transmit a number of distinct RS resources, wherein each of the RS resources includes a number of RS ports—this is shown at block 902. The example method 900 further includes transmitting an indication of which RS resources the UE can transmit on simultaneously, as shown at block 904, and receiving an indication of at least one RS resource, as shown at block 906. Note that transmitting an indication of which RS resources the UE can transmit on simultaneously is a specific example of the UE transmitting capability information that indicates that the UE 50 is capable of transmitting simultaneously on multiple resources.

Not shown in example method 900, but discussed above, is that the UE 50 may receive first and second RS configurations from the network, e.g., where the first RS configuration is a first list of SRS resources that at least correspond to RS resource indications used for PUSCH transmission, and the second RS configuration is a second list of RS resources that may be used for SRS transmission. In various embodiments, this step may be an alternative to the step shown in block 904, or an additional step.

The method 900 still further includes transmitting a physical channel on antennas of the UE associated with the indicated at least one RS resource, as shown at block 908.

In some embodiments, the method 900 further includes transmitting MIMO layers on different antenna subsets in the UE. In these embodiments, the method 900 also includes transmitting an indication that the UE cannot control the relative phase between antenna ports corresponding to different RS resources while transmitting on the antenna ports. The step of receiving an indication of at least one RS resource further comprises receiving a plurality of RS resources and a precoder corresponding to each of the plurality of RS resources. The step of transmitting the physical channel comprises using the indicated precoders on antennas of the UE associated with each of the indicated RS resources.

The method 900 may also include receiving an indication of at least one precoder corresponding to each of the at least one RS resources and transmitting the physical channel using the indicated precoders on antennas of the UE associated with the indicated RS resource.

The method 900 may include adjusting the transmitted power of a plurality of RS resources, where the RS resources are transmitted simultaneously and the transmitted power of each of the RS resources is adjusted by a power control command that is distinct from the power control commands adjusting the other RS resources. In some embodiments, the method 900 may include adjusting the transmitted power of a PUSCH corresponding to one or more RS resource indicators or adjusting the transmitted power of one or more SRS resources corresponding to respective RS resource indicators, or both, wherein the transmitted power corresponding to each of the one or more RS resource indicators or each of the respective RS resource indicators is adjusted by power control commands that are distinct from power control commands adjusting transmitted power corresponding to others of the one or more RS resource indicators or respective RS resource indicators.

In some embodiments, a plurality of RS resources are indicated to the UE, and the method 900 further includes transmitting the physical channel on a plurality of antenna subsets corresponding to the plurality of indicated RS resources, using a precoder that jointly adjusts the phase of all RS ports comprised within the plurality of indicated RS resources.

Figure 10:
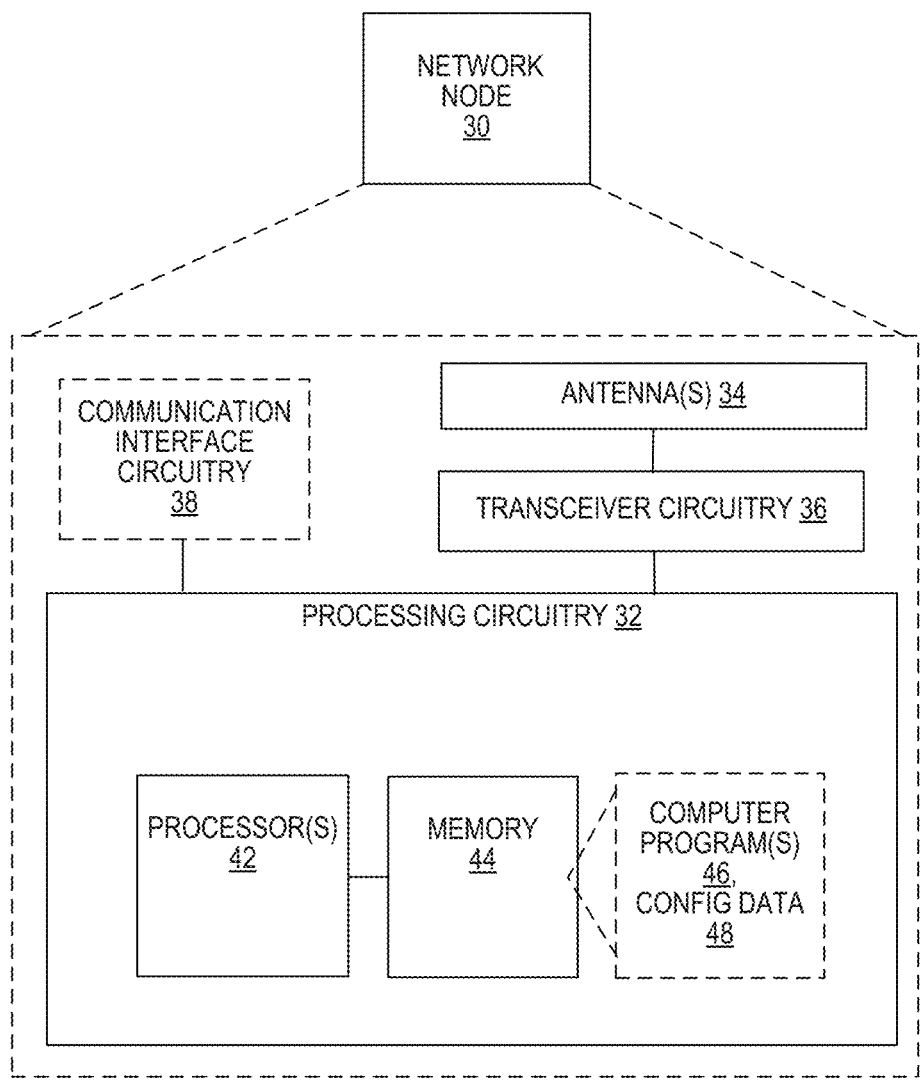
FIG. 10 illustrates an example network node.

FIG. 10 is a block diagram illustrating an example network node 30 in a wireless communication system (e.g., a cellular communications system) in which embodiments of the present disclosure may be implemented. Network node 30 may be a network access point, for example, such as an eNB or gNB. In the illustrated example, network node 30 is a radio access node, Transmission and Reception Point (TRP), base station or other general radio node allowing communication within a radio network. In various embodiments, network node 30 may also represent, for example, a base transceiver station, a base station controller, a network controller, an enhanced or evolved Node B (eNB), a Node B, a gNB (access point supporting NR or 5G), Multi-cell/Multicast Coordination Entity (MCE), a relay node, an access point, a radio access point, or a Remote Radio Unit (RRU) Remote Radio Head (RRH). It will be appreciated that some of these examples do not include radio circuitry for communicating with UEs but are connected via communication interface circuit(s) 38 with one or more other network nodes that do. In some embodiments, network node 30 provides wireless access to other nodes such as wireless device 50 or other access nodes within a coverage area (e.g., cell) of the network node 30. The network node 30 described here in configured to operate in a NR network, but may be applicable to other networks or standards that utilize the techniques discussed herein.

As illustrated in FIG. 10, the network node 30 includes processing circuitry 32 comprising one or more processors 42 (e.g., CPUs, ASICs, FPGAs, and/or the like) and a memory 44 that stores computer programs 46 and, optionally, configuration data 48. The network node 30 may include communication interface circuitry 38 to communicate with the core network or other network nodes. The illustrated network node 30 also includes transceiver circuitry 36, which may include one or more transmitters and receivers coupled to one or more antennas 34, for communication with wireless devices, such as wireless device 50. In some embodiments, the functionality of the network node 30 described herein may be fully or partially implemented in software that is, for example, stored in the memory 44 and executed by the processor(s) 42.

In some embodiments, the memory 44 of the network node 30 stores instructions that when executed by one or more of the processors 42 configures the network node 30 to carry out one or more of the techniques described herein.

Figure 11:
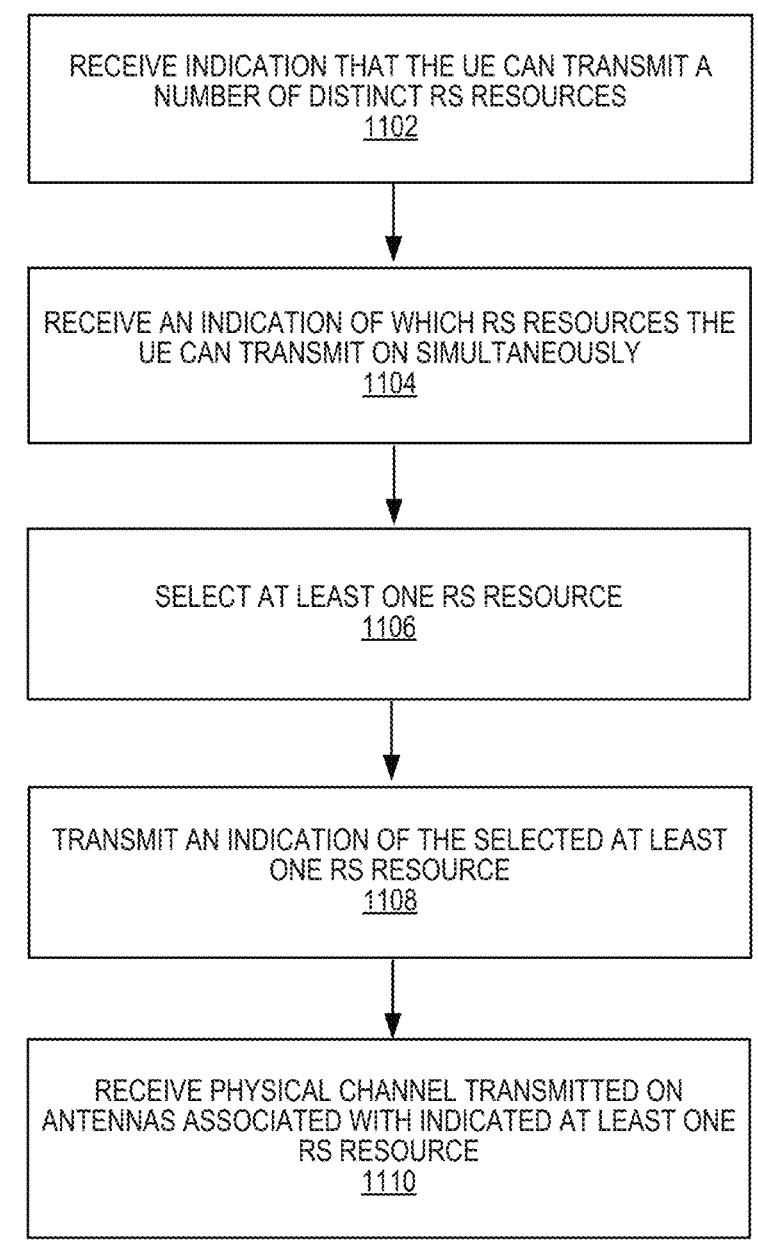
FIG. 11 is a process flow diagram illustrating another example method according to some embodiments.

Network node 30, whether operating alone or in combination with one or more other network nodes, may be configured to carry out the method illustrated in FIG. 11, for example, and variants thereof. Method 1100, as shown in FIG. 11, includes the steps of receiving an indication that the UE can transmit a number of distinct RS resources, wherein each of the RS resources comprises a number of RS ports this is shown at block 1102. The example method 1100 further comprises receiving an indication of which RS resources the UE can transmit on simultaneously, as shown at block 1104, and selecting at least one RS resource, based on the received indications, as shown at block 1106. It will be appreciated that an indication of which RS resources the UE can transmit on simultaneously is a specific example of more general UE capability information that indicates that the UE is capable of transmitting simultaneously on multiple resources.

Although not illustrated in example method 1100, network node 30 may, in some embodiments, send the UE first and second RS configurations, where the first RS configuration is a first list of SRS resources that at least correspond to RS resource indications used for PUSCH transmission, and the second RS configuration is a second list of RS resources that may be used for SRS transmission. In some embodiments, the network node 30 may send the UE a transmission request, where the transmission request is constructed by the network node 30 to avoid instructing the UE to transmit SRS resources that the UE cannot transmit simultaneously, e.g., using capability information provided by the UE.

The method 1100 still further comprises transmitting an indication of the selected at least one RS resource to the UE, as shown at block 1108, and receiving a physical channel transmitted by the UE on antennas of the UE associated with the indicated at least one RS resource, as shown at block 1110.

The method 1100 may further include receiving MIMO layers transmitted on different antenna subsets in the UE and receiving an indication that the UE cannot control the relative phase between antenna ports corresponding to different RS resources while transmitting on the antenna ports. The step of transmitting an indication of at least one RS resource may include transmitting a plurality of RS resources and a precoder corresponding to each of the plurality of RS resources. The received physical channel may be transmitted using the indicated precoders on antennas of the UE associated with each of the indicated RS resources.

The method 1100 may further include receiving an indication of at least one precoder corresponding to each of the at least one RS resources and transmitting the physical channel using the indicated precoders on antennas of the UE associated with the indicated RS resource.

The method 1100 may include transmitting, to the UE, power control commands for each of a plurality of RS resources of the UE, where the RS resources are transmitted simultaneously and the transmitted power of each of the RS resources is adjusted by a power control command that is distinct from the power control commands adjusting the other RS resources.

In some embodiments, a plurality of RS resources are indicated to the UE and the method 1100 further includes receiving the physical channel transmitted on a plurality of antenna subsets corresponding to the plurality of indicated RS resources, using a precoder that jointly adjusts the phase of all RS ports comprised within the plurality of indicated RS resources.

Other embodiments of the inventive techniques and apparatus disclosed herein include computer programs and computer program products including instructions that, when executed by at least one processor of the wireless device 50, cause the at least one processor of the wireless device 50 to carry out one or more of the methods described above. Similarly, embodiments include computer programs and computer program products including instructions that, when executed by at least one processor of a network node, cause the at least one processor of the network node 30 to carry out one or more of the methods described above for network node 30.

The following provides context for and additional details to supplement the various techniques described above.

Some agreements for UL-MIMO codebook structure, such as from RAN1 #88 and RAN1 #88 bis, include NR supporting UL-MIMO scheduling by DCI. This support can include an indication of an SRI that has been transmitted by this UE in a previous time instance. Each configured SRS resource is associated with at least one UL Tx beam/precoder; no SRI is needed when a single SRS resource is configured. The support for can also include a TRI for possible values that are up to the number of SRS ports configured in the indicated SRI, and a wideband TPMI. The TPMI is used to indicate a preferred precoder over the SRS ports in the selected SRS resource by the SRI. Precoding matrices may depend on the number of SRS ports configured in the indicated SRI. This field may be used for non-codebook-based UL-MIMO transmission and subband TPMI may be signaled. There may be multiple ways for indicating selection of multiple SRS resources.

When a UE is configured with UL frequency selective precoding and if subband. TPMI signaling is supported, one of the following alternatives may be supported: 1) subband TPMI s are signaled via DCI to the UE only for allocated PRBs for a given PUSCH transmission; or 2) subband TPMIs are signaled via DCI to the UE for all PRBs in UL, regardless of the actual RA for a given PUSCH transmission. Subband TPMI may correspond to W2 if dual-stage codebook is supported. Wideband TPMI might always be signaled along with subband TPMI.

Furthermore, there may be a predetermined minimum number, as well as the definition, of X and Y ports that are used to support frequency selective precoding for multiple schemes, e.g., Scheme A and B. As for this agreement, Scheme A is a codebook based UL transmission relating to a previous agreement involving support of frequency selective precoding for CP-OFDM when the number of transmission port(s) is equal to or greater than X. Scheme B is a Non-codebook based UL transmission related to support of frequency selective precoding for CP-OFDM when the number of transmission port(s) is equal to or greater than Y.

The main difference between codebook-based and non-codebook-based UL transmission schemes in NR is that for Codebook based UL transmission, TPMI is signaled to the UE, while for Non-codebook based UL transmission TPMI is not signaled. Another difference is that for Codebook based UL transmission, no power amplifiers (PAs) are intended (allowed) to be mapped to more than one SRS port in order to preserve the power amplifier utilization when applying additional precoding over the SRS ports. For Non-codebook based UL transmission on the other side, PAs are intended (allowed) to be mapped to multiple SRS ports because no additional precoding will be applied over the SRS ports.

In some embodiments, for Codebook based UL transmission, at least one TPMI is signaled back to the UE to determine precoder for UL transmissions. In other embodiments, for Non-codebook based UL transmission, no TPMI is signaled back to the UE. Instead SRI(s) may be signaled back to the UE to determine precoder for UL transmissions.

A primary driver for TPMI overhead is whether wideband or frequency selective TPMI is supported. TPMI overhead might be reasonably carried in PDCCH and upper bounds may be determined for what gain might be possible from frequency selective precoding.

Signaling to support Codebook based frequency selective precoding on uplink and downlink are fundamentally different. In the downlink, TPMI signaling can be avoided, since the UE can determine the effective channel by measuring DMRS. However, in Codebook based UL MIMO, the UE must be aware of the precoding desired by the gNB, and so must be signaled with TPMI.

A second difference between uplink and downlink precoding is that UCI payloads can be a wide variety of sizes, while a UE is configured for only a small number of DCI formats with fixed sizes. Therefore, PMI for DL MEMO can have a wide variety of sizes, while TPMI for UL MIMO should preferably have a fixed size. Note that two-stage DCI signaling is possible to carry additional overhead, but such two stage designs could significantly complicate NR control signaling in general and may not be preferred in at least a first version of NR.

Another difference is that UCI can be carried on a wide variety of PUCCH formats as well as PUSCH, which allows UCI to adapt according to coverage requirements. While PDCCH supports compact and larger DCI formats to allow for different coverage conditions, there is considerably less flexibility.

Another observation is that NR PDCCH should have the same coverage as LTE PDCCH, and therefore the format sizes should be similar. This can be used as a rough guide for TPMI sizes for NR UL MIMO. Note that up to 6 bits are used for 4 Tx precoding and rank indication and that 5 bits are used for MCS of a second transport block, with 1 bit for a new data indicator. Therefore, a total of 11 bits for all of TPMI, SRI, and RI would have a consistent amount of overhead relative to LTE with respect to UL MIMO operation.

It has been observed that roughly 10 DCI bits for all of TPMI, SRI, and RI can be used as a starting point for NR UL MIMO codebook design.

Performance of wideband and subband TPMI will now be discussed. The number of bits needed for frequency selective TPMI tends to be proportionate to the number of subbands. In this section, high level simulation results obtained by the inventors are presented, comparing the ideal array gains of rank 1 subband TPMI-based transmission to that using wideband transmission. The upper and lower bound performances are evaluated by ideal closed loop (CL) MIMO based on the SVD of subband correlation matrices and an ideal transmit diversity (TXD) scheme. For a performance comparison, the Rel 8 codebook and an example codebook were evaluated with non-constant modulus elements. Rank 1 precoding is used, since this is where the greatest gains tend to be, and so can serve as an initial check on the merits of subband TPMI. The plots shown in FIGS. 12-15 are obtained by using the channel realizations extracted from the system-level simulators with the 3GPP evaluation assumptions to model a single link. Therefore, system level considerations such as inter-UE interference are not captured in the performance comparison. Ideal channel estimation is used. Consequently, the results can be considered as upper bounds on the gains of frequency selective precoding. Simulation results for UEs equipped with multi-panels are shown in FIGS. 12-15. Two (four) UE antennas are implemented as two (four) single-port panels to transmit signals from different angles, i.e., at the angles of 0 degree and 180 degree (0 degree, 90 degree, 180 degree and 270 degree) azimuth.

Figure 12:
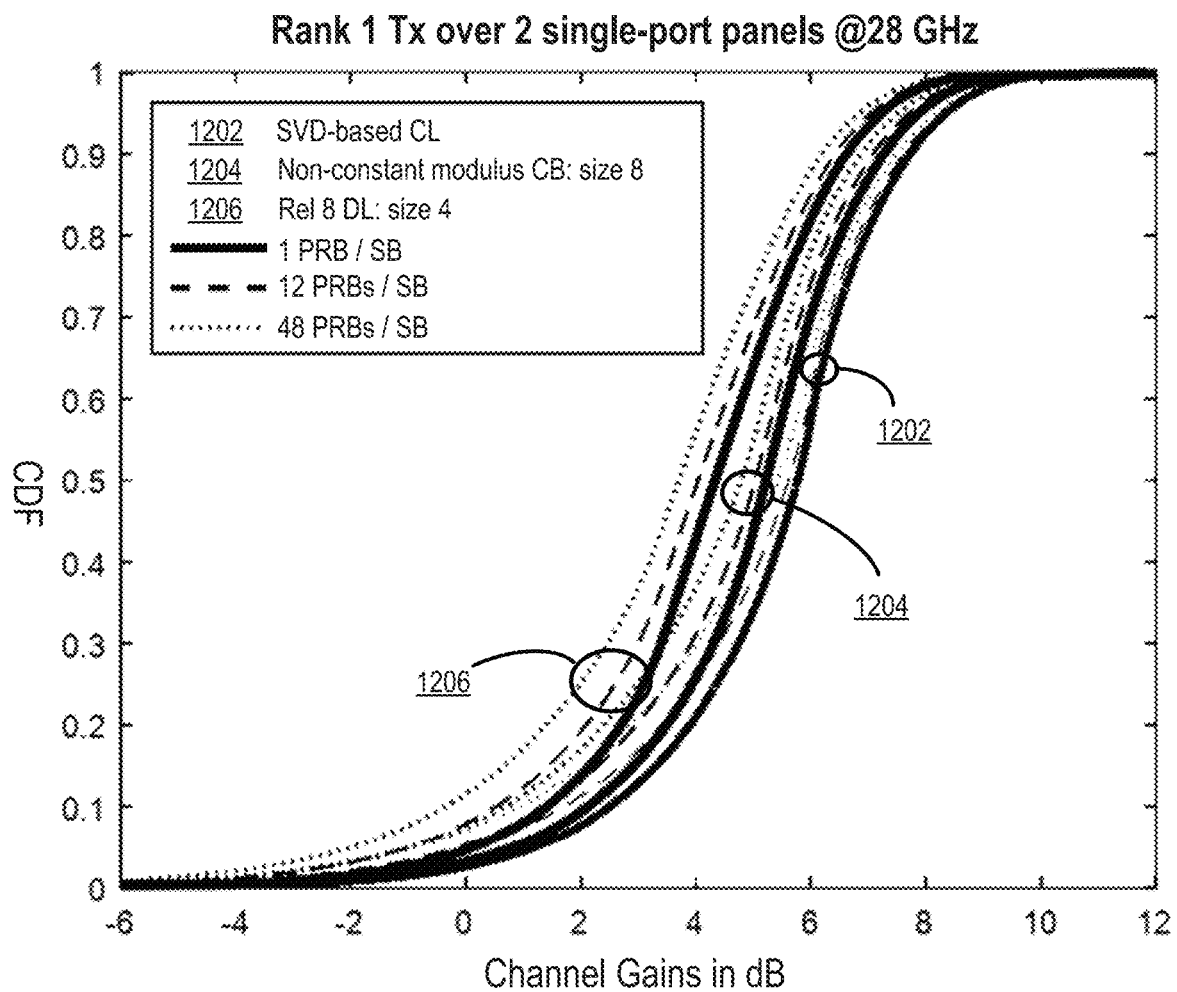
FIGS. 12 and 13 illustrate achievable channel gains between different transmit schemes and different codebooks for rank 1 transmission over 2 single-port panels at 28 GHz.
Figure 13:
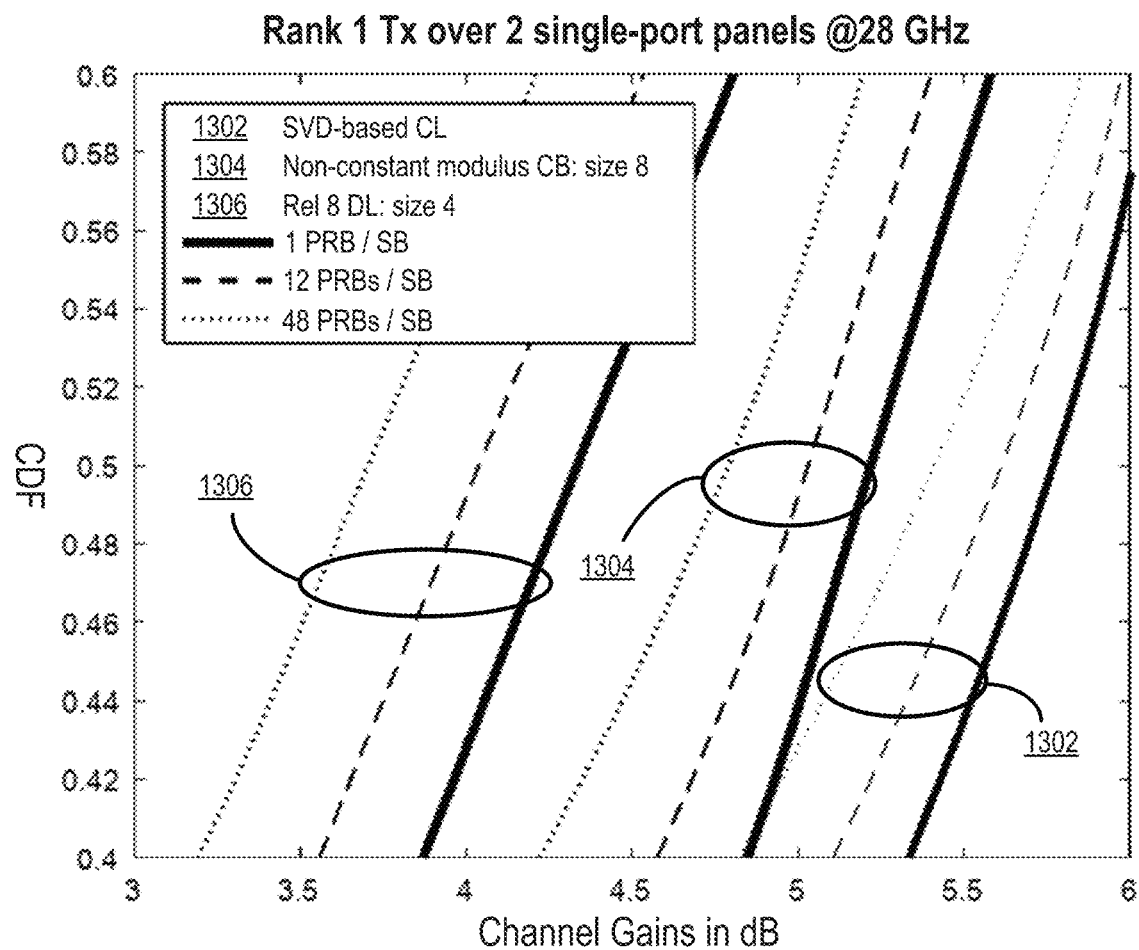

FIGS. 12-13 show evaluation results for rank 1 transmission over 2 one-port panels with a channel bandwidth of 10 MHz at the frequency of 28 GHz. In these simulations, three different subband sizes are compared, namely 1 PRB and 12 PRBs per subband in addition to the wideband transmission, assuming 48 PRBs in total, which is depicted in different curves grouped by ellipses in the figures.

From these results, it is observed that the maximum (essentially theoretical) gain up to 0.4 dB is achievable by the subband TPMI-based transmission with one PRB per subband over the wideband transmission. More realistic numbers of subbands, such as 4 subbands, produce on the order of 0.15 dB median gain.

Comparing codebooks, it can be seen that the example codebook tends to notably outperform the Rel-8 codebook, often having a median gain that is on the order of 1.0 dB. The wideband example codebook with an overhead of 3 bits actually outperforms the Rel-8 codebook even when the Rel-8 codebook uses many more bits (with per subband TPMI). Gains of the example codebook are expected largely due to its use of non-constant modulus elements, and so conclude that a larger codebook with non-constant modulus elements may be a better performing solution than using more subbands with a Rel-8 (constant modulus) codebook. This is particularly true for millimetre wave cases, since the directivity of the different panels can lead to widely varying received power levels at gNB from the panels.

FIGS. 12 and 13 illustrate a performance comparison in terms of achievable channel gains between different transmit schemes and different codebooks for rank 1 transmission over 2 one-port panels at frequency 28 GHz.

Figure 14:
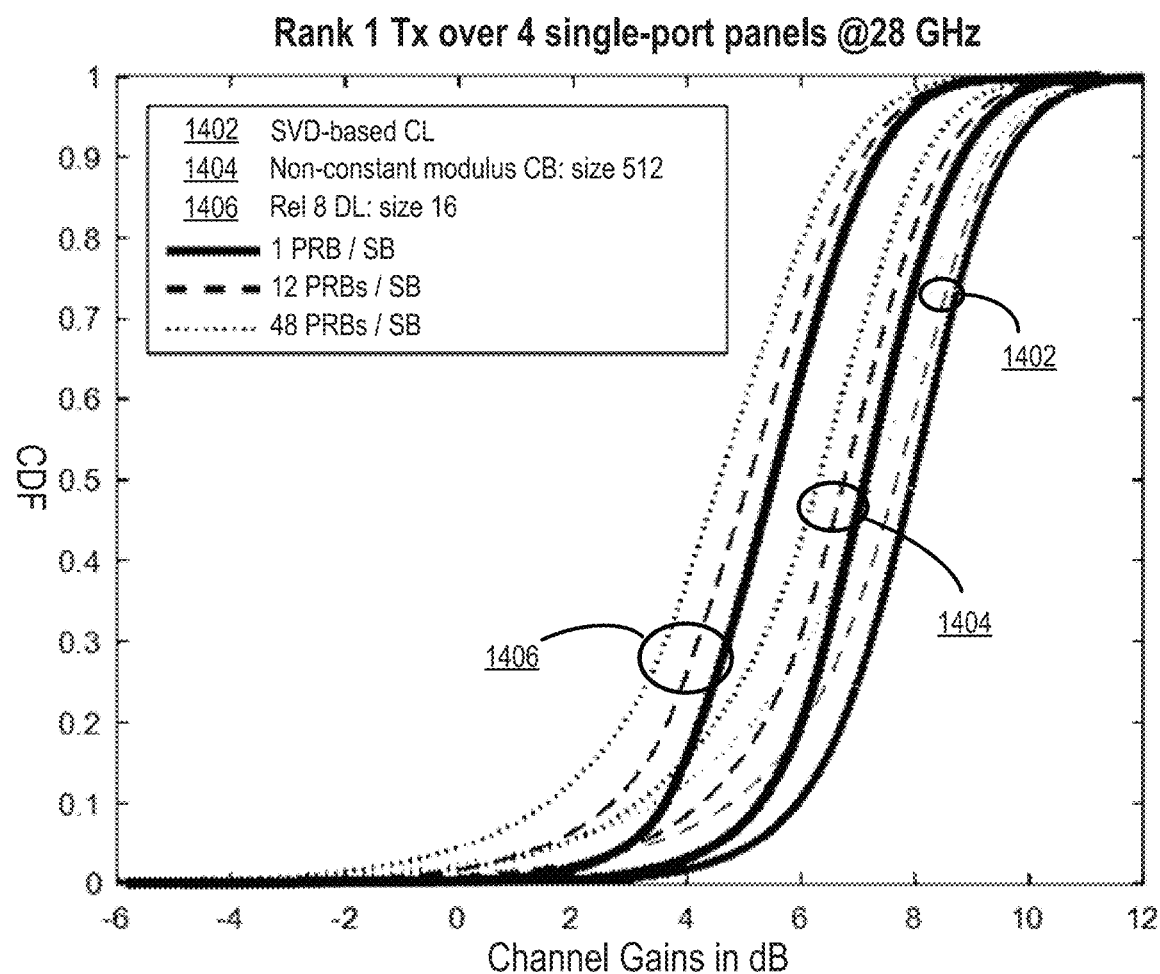
FIGS. 14 and 15 illustrate achievable channel gains between different transmit schemes and different codebooks for rank 1 transmission over 4 single-port panels at 28 GHz.
Figure 15:
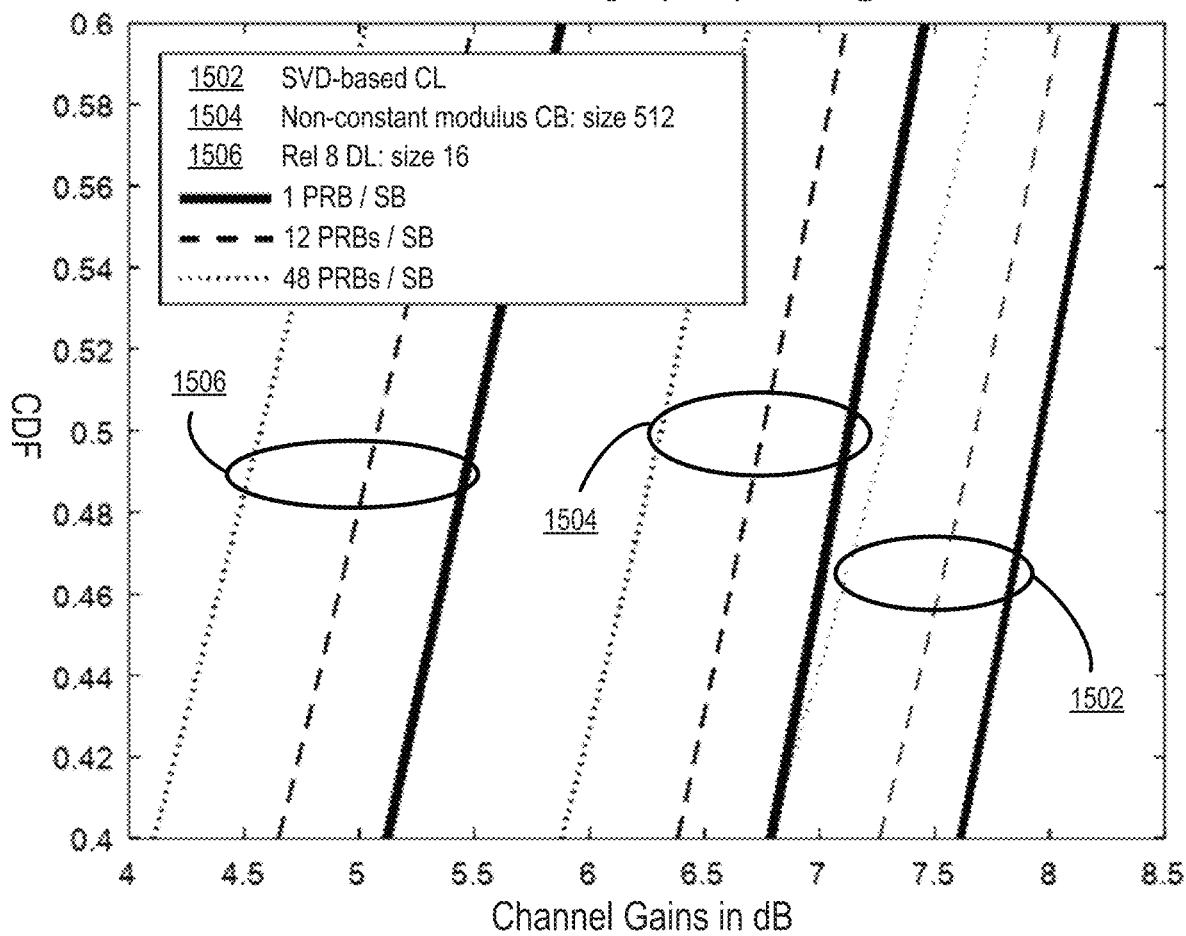

FIGS. 14 and 15 illustrate a performance comparison in terms of achievable channel gains between different transmit schemes and different codebooks for rank 1 transmission over 4 one-port panels at frequency 28 GHz. The simulation results for rank 1 transmission over 4 one-port panels are provided in FIGS. 14 and 15, Similar observations can be made for these 4 one-port panels. In particular, the gain from practical numbers of subbands in frequency selective precoding is again a few tenths dB, However, since 4 port codebooks are larger than 2 port codebooks, TPMI overhead for 4 port subband precoding to reach the same gains as for 2 port subband precoding is much larger. Therefore, subband TPMI seems less motivated for 4 ports than for 2 ports, it has been observed that gains from subband TPMI with practical numbers of bits in realistic channels may be modest. For example, for both 2 and 4 ports at 28 GHz, it has been observed on the order of 0.15-0.3 dB median gain in UMa. It has also been observed that increasing codebook size and using non-constant modulus elements can provide substantially better gains than increasing subband size in multi-panel UEs.

Based on the simulation results presented in this contribution, in some embodiments, subband TPMI may be needed. The value of X may not be determined by UL MIMO subband precoding gains. Codebooks with non-constant modulus may be considered as an alternative to subband TPMI for UL MIMO.

The antenna array topology of LTEs is expected to be quite arbitrary with respect of antenna element radiation patterns, polarization properties, antenna element separations and pointing directions.

For UE implementations, especially at higher frequencies, it is expected that the different antenna arrangements within a UE (where each antenna arrangement, e.g. a single antenna element or a panel, is assumed to be connected to one baseband port) will experience channels with low or no correlation, for example due to radiation patterns pointing in different directions, large separation between the antenna arrangements or orthogonal polarizations. This is not to say that simple i.i.d. models are appropriate. Rather, evaluations with realistic channels and models of these various UE configurations are needed to produce a robust codebook.

Hence, it is desired to create a codebook that can function well in a wide variety of UE antenna configurations and channel conditions. The DL DFT-based codebooks which are based on a uniform linear array of antenna elements or subarrays, with equally spaced antenna elements, may not be sufficient for UEs.

It has been observed that to support full UE antenna implementation freedom, an NR codebook should be designed considering a wide variety of UE antenna configurations and channel conditions.

Moreover, a number of optimizations are possible for UL codebook design. Since both DFT-S-OFDM and CP-OFDM are to be supported for the uplink, one could design codebooks for both sets of waveforms. Multi-stage or single stage codebooks could be supported according to channel conditions and the amount of UL overhead that can be tolerated. Cubic metric preserving codebooks, or those with non-constant modulus elements could be configured to allow some potential power saving vs. performance tradeoffs, and so on. Therefore, it may be desirable to start with a simple, robust design as a baseline, and to add codebooks one-by-one after their performance gains, complexity benefits, and use cases are established.

Optimizations should keep in mind the use cases of UL MIMO. The primary goal of multiple Tx chains in a UE is generally SU-MIMO, since it allows a higher peak rate that an end user can benefit from having. System capacity gains are more likely to be from uplink sectorization and/or MU-MIMO, since gNBs tend to have more (perhaps many more) receive antennas. It is not possible to set cell coverage based on multiple Tx antennas if multiple Tx antennas is a UE capability, and therefore multiple UE antennas are not an effective way in general to increase range. Therefore, designs should focus on getting the most "bang for the buck" out of the DCI bits possible and using simple schemes.

It is observed that a wide variety of codebooks could be design for CP-OFDM vs. DFT-S-OFDM, CM preserving vs. non-constant modulus, single stage vs. multi-stage, etc. Accordingly, the design of a robust, simple, codebook as a baseline, and add other codebooks according to their gain, complexity, and use case should be prioritized.

It is still undecided if 8 port SRS will be supported. As discussed above, UL MIMO design is primarily motivated by peak rate. NR requires a peak spectral efficiency of 15 bps/Hz on the uplink, and this can be met with four 64 QAM MIMO layers each with a code rate of ⅝. Therefore, there does not seem to be a need for 8 MIMO layers nor a codebook to support 8 SRS ports at least in a first release of NR. Note that forward compatibility should be kept in mind, so even if Rel-15 NR does not support 8 MIMO layers, it may be desirable to have 8 DMRS and 8 SRS ports in Rel-15. It has been observed that 4 layer SU-MIMO can meet NR peak spectral efficiency requirements of 15 bps/Hz. Rel-15 NR may support at most 4 layers for SU-MIMO transmission and codebooks.

Due to the assumption that, at least in some UE implementations, different antennas at a UE are expected to have low correlation a dual stage codebook (i.e. with a W=W1W2 structure, as defined for the LTE downlink) may not suffice, since this structure is specifically tailored to separate wideband (and potentially slowly varying) and subband behavior. Furthermore, a 2 SRS port codebook will only be single stage.

However, in UE configurations and with larger numbers of SRS ports, if channels show sufficient correlation, this could be exploited for reducing feedback as is done by the dual stage codebook. In some embodiments, UL codebooks may include a dual stage structure. It has been observed that a single stage codebook structure is likely to be needed to handle low channel correlation. In some embodiments, a multi stage codebook structure (e.g. using W=W1W2 as in DL) may be used to reduce overhead if channel correlation so allows.

Two alternatives from RAN1 #88 bis have fundamental implications on whether TPMI is persistent over time. In Alternative 1, subband TPMIs may be signaled via DCI to the UE only for allocated PRBs for a given PUSCH transmission. In Alternative 2, subband TPMIs may be signaled via DCI to the UE for all PRBs in UL, regardless of the actual RA for a given PUSCH transmission.

In Alternative 1, TPMI applies only to a PUSCH transmission. This means that there is no interdependence or accumulation of TPMI between subframes, i.e., TPMI is "single shot." Allowing TPMI to be persistent could be used to reduce overhead, e.g., in multi-stage codebooks where a long term "W1" is signaled less frequently than a short term "W2". Similarly, different TPMIs in different subframes could apply to different subbands. However, if or how much overhead can be saved depends on channel characteristics and how many PUSCH transmissions a UE makes.

Furthermore, TPMI only applies to PUSCH, rather than other signals, such as SRS. This is in contrast to Alternative 2, which allows precoded SRS controlled by TPMI. Since eNB knows the TPMI, and has either non-precoded. SRS or DMRS, eNB should be able to determine the composite channel after precoding, and there is no benefit from, e.g., interference estimation or power control perspectives. Furthermore, multiple SRS resources can be used to track the beamforming gain of Tx chains. TPMI may control SRS precoding. Finally, it is unclear if Alternative 2 applies outside of a bandwidth part. In some embodiments, a variation of Alternative 1 from RAN1 #88 bis is supported for at least wideband TPMI and single stage codebook: TPMI is signaled via DCI to the UE only for allocated PRBs for a given PUSCH transmission In some embodiments, the codebook may be used for Codebook based UL transmissions only contains port combining precoders (i.e., no port selection precoders as this can be handled via SRI) in order to minimize the size of the codebook and hence reduce the overhead signaling.

As NR probably will support only a limited number of ports in a codebook, whereas the number of SRS resources will be more flexible, it can be advantageous to use SRI instead of codebook for port selection. It has been observed that SRI can be used for UE Tx antenna selection without increasing TPMI overhead. In some embodiments, codebook for codebook based UL transmission should only contain port combining precoders.

Since antenna patterns, orientations, and polarization behavior will vary widely in UEs, it may not be practical to develop models specifically for multi-panel UEs. However, codebook designs that support uncorrelated elements can provide gains across a wide variety of antenna configurations. Therefore, a sufficiently robust single panel design could be used in the multi panel case. It has been observed that robust single panel designs can be used for multi-panel applications. In some embodiments, UL codebook design targets single panel operation, and multi-panel operation may be supported with the single panel design.

It is natural to transmit different panels on different SRS resources, since spatial characteristics of elements in panels are likely to be different between panels. However, it can also be beneficial to transmit simultaneously on multiple panels to produce a higher rank, a more directive transmission, and/or to combine transmit power from multiple power amplifiers. Consequently, the ports to which a codebook can apply should be able to be formed by aggregating SRS resources. When multiple SRI(s) are indicated, the TPMI applies across all ports in the indicated resources, and a codebook corresponding to the aggregated resource is used. In some embodiments, TPMI can apply to aggregated. SRS Resources indicated by multiple SRI(s).

Concepts for UL beam management are currently being developed for NR to control the beam (or more correctly the effective antenna pattern) for respective UE panel. It is expected that UL beam management is performed by letting the UE transmit different SRS resources in different UE panel beams, which the TRP performs RSRP measurements on and signals back the SRI(s) corresponding to the SRS resource(s) with highest RSRP value(s). If a multi-panel UE is scheduled for SRS transmission of multiple beams from each of the multiple panels, the TRP and UE need to have a mutual agreement of which combinations of SRS resources can be transmitted simultaneously from the different panels. Otherwise, the TRP could select SRS resources that could not be transmitted simultaneously, such as when the SRS resources correspond to different switched analog beams in a panel. One way to solve this is to identify groups of SRS resources, where only one of the resources in an SRS resource group can be transmitted at a time. The one resource from each of the SRS resource groups can be transmitted simultaneously with each of the other selected SRS resources from the other groups. Given the knowledge of the number of SRS groups, and which SRS resources are in the groups, the TRP can determine which SRS resources it can instruct the UE to transmit when multiple SRIs are signaled.

Note that the notion of an SRS resource group here serves a similar purpose to DMRS port groups defined for the NR downlink and to the SRS port group. Given that an SRI refers to an SRS resource, and since an SRS antenna port group would seem to imply some selection or subdivision within one SRS resource, "SRS resource group" seems to be more appropriate to describe the intended behavior.

In some embodiments, SRS resource groups may be defined, where a UE can be assumed to be able to transmit only one SRS resource in an SRS resource group at a time, and where a UE can simultaneously transmit one SRS resource from each of multiple SRS resource groups.

A variety of UL MIMO codebook related issues have been explored, including definitions of codebook based UL transmission and non-codebook based UL transmission, the design of UL MIMO codebooks, the amount of TPMI overhead that may be available to support them, the benefit of frequency selective preceding, whether TPMI should be persistent, and the number of ports and layers UL SU-MIMO and the codebook should be designed for. It has been observed that: roughly 10 DCI bits for all of TPMI, SRI, and RI can be used as a starting point for NR UL MIMO codebook design; and gains from subband TPMI with practical numbers of bits in realistic channels may be modest. For example, for both 2 and 4 ports at 28 GHz, on the order of 0.15-0.3 dB median gain has been observed in UMa.

It has also been observed that increasing codebook size and using non-constant modulus elements can provide substantially better gains than increasing subband size in multi-panel UEs. To support full UE antenna implementation freedom, NR codebook should be designed considering a wide variety of UE antenna configurations and channel conditions. It has been observed that a wide variety of codebooks could be design for CP-OFDM vs. DFT-S-OFDM, CM preserving vs. non-constant modulus, single stage vs. multi-stage, etc. It has been observed that 4 layer SU MIMO can meet NR peak spectral efficiency requirements of 15 bps/Hz. A single stage codebook structure is likely to be needed to handle low channel correlation.

It has also been observed that SRI can be used for LITE Tx antenna selection without increasing TPMI overhead, and robust single panel designs can be used for multi-panel applications.

In some embodiments, for Codebook based UL transmission, at least TPMI is signaled back to the UE to determine precoder for UL transmissions. For Non-codebook based. UL transmission, no TPMI may be signaled back to the UE, instead SRI(s) will signaled back to the UE to determine precoder for UL transmissions. Subband TPMI may be used in some cases.

In some embodiments, the value of X is not determined by UL MIMO subband precoding gains. Codebooks with non-constant modulus may be considered as an alternative to subband TPMI for UL MIMO.

In some embodiments, the design of a robust, simple, codebook as a baseline, and add other codebooks according to their gain, complexity, and use case may be prioritized. Rel-15 NR may support at most 4 layers for SU-MIMO transmission and codebooks. A multi stage codebook structure (e.g., using W=W1W2 as in DL) could be useful to reduce overhead if channel correlation so allows.

In some embodiments, a variation of Alt 1 from RAN1 #88 bis is supported for at least wideband TPMI and single stage codebook: TPMI is signaled via DCI to the UE only for allocated PRBs for a given PUSCH transmission. Codebook for Codebook based UL transmission should only contain port combining precoders in some cases.

UL codebook design may target single panel operation, and multi-panel operation may be supported with the single panel design.

TPMI can apply to aggregated SRS Resources indicated by multiple SRI(s). SRS resource groups may be defined, where a UE can be assumed to be able to transmit only one SRS resource in an SRS resource group at a time, and where a UE can simultaneously transmit one SRS resource from each of multiple SRS resource groups.

Figure 16:
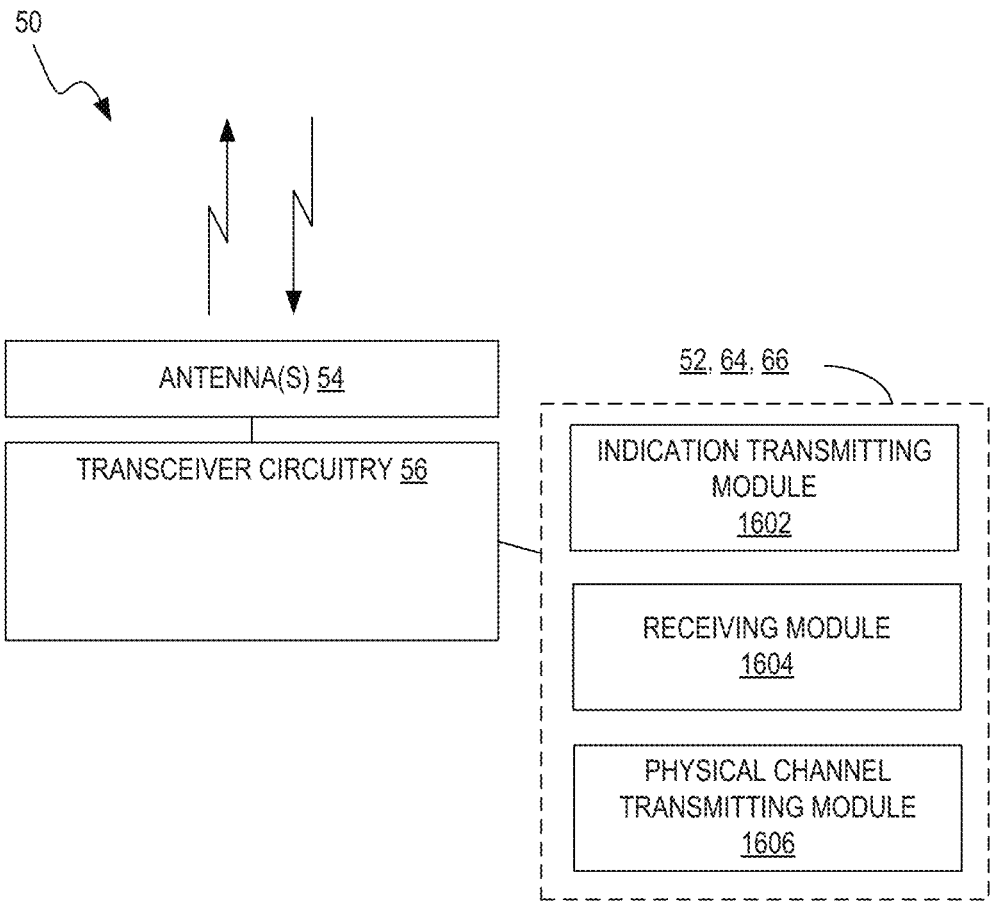
FIG. 16 is a functional representation of an example UE.

FIG. 16 is a schematic block diagram of a wireless device 50 according to some other embodiments of the present disclosure. The node includes one or more modules, each of which is implemented in software. The modules provide the functionality of the wireless device according to any of the several UE-related techniques described herein, and include an indication transmitting module 1602 for transmitting an indication that the UE can transmit a number of distinct RS resources, where each of the RS resources comprises a number of RS ports, and for transmitting an indication of which RS resources the UE can transmit on simultaneously. The illustrated wireless device 50 further includes a receiving module 1604 for receiving an indication of at least one RS resource, and a physical channel transmitting module 1606 for transmitting a physical channel on antennas of the UE associated with the indicated at least one RS resource.

Figure 17:
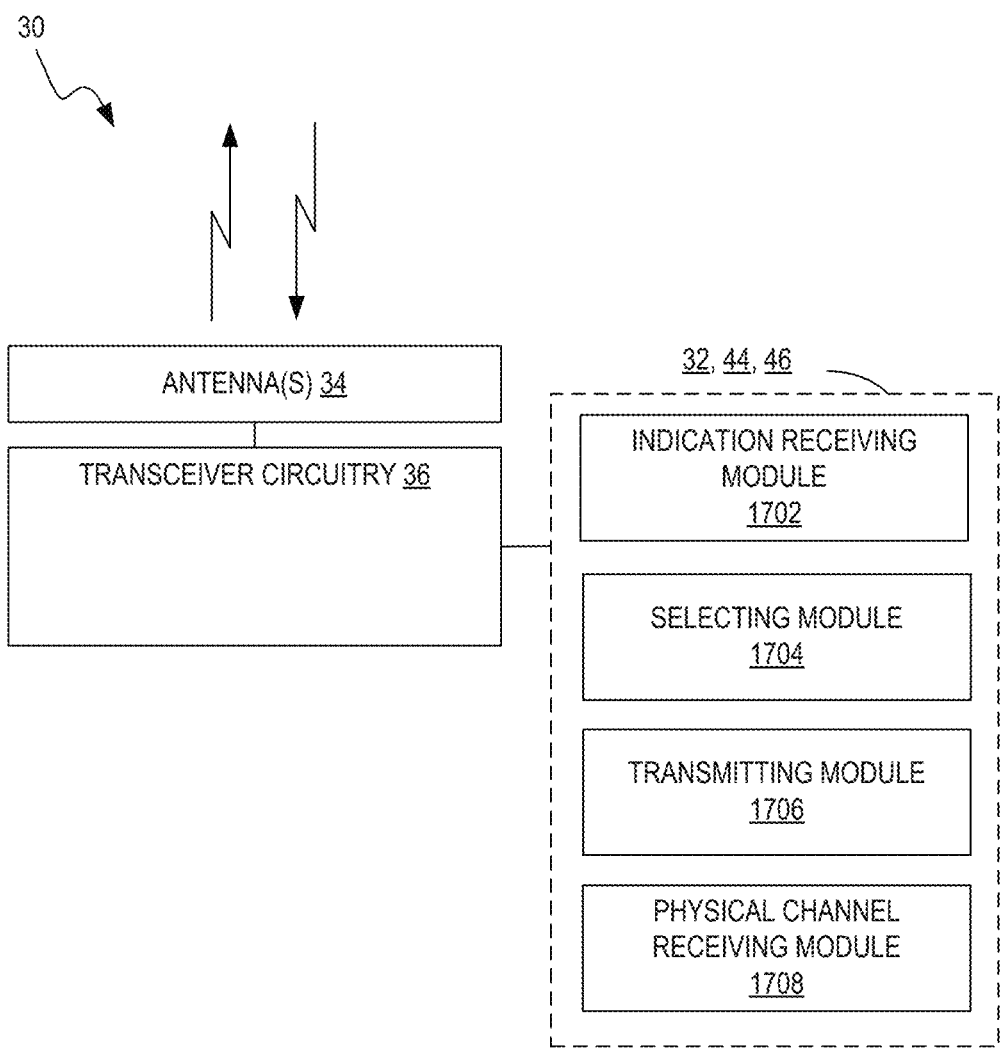
FIG. 17 is a functional representation of an example network node.

Similarly, FIG. 17 is a schematic block diagram of a network node according to some other embodiments of the present disclosure. The node includes one or more modules, each of which is implemented in software. The modules provide the functionality of the network node, according to several embodiments, and include an indication receiving module 1702 for receiving an indication that the UE can transmit a number of distinct RS resources, wherein each of the RS resources comprises a number of RS ports, and for receiving an indication of which RS resources the UE can transmit on simultaneously, as well as a selecting module 1704 for selecting at least one RS resource, based on the received indications. The illustrated network node 30 further comprises a transmitting module 1706 for transmitting an indication of the selected at least one RS resource to the UE, and a physical channel receiving module 1708 for receiving a physical channel transmitted by the UE on antennas of the UE associated with the indicated at least one RS resource.

Notably, modifications and other embodiments of the disclosed invention(s) will come to mind to one skilled in the art having the benefit of the teachings presented in the foregoing descriptions and the associated drawings. Therefore, it is to be understood that the invention(s) is/are not to be limited to the specific embodiments disclosed and that modifications and other embodiments are intended to be included within the scope of this disclosure. Although specific terms may be employed herein, they are used in a generic and descriptive sense only and not for purposes of limitation.

Embodiments of the techniques and apparatuses disclosed above include, but are not limited to, the following examples:
(a). A method, in a UE, of transmitting on different antenna subsets in the UE, the method comprising:
transmitting an indication that the UE can transmit a number of distinct RS resources, wherein each of the RS resources comprises a number of RS ports;
transmitting an indication of which RS resources the UE can transmit on simultaneously;
receiving an indication of at least one RS resource;
transmitting a physical channel on antennas of the UE associated with the indicated at least one RS resource.
(b). The method of example embodiment (a), wherein the method further comprises transmitting MIMO layers on different antenna subsets in the UE, wherein:
the method further comprises transmit an indication that the UE cannot control the relative phase between antenna ports corresponding to different RS resources while transmitting on the antenna ports;
the step of receiving an indication of at least one RS resource further comprises receiving a plurality of RS resources and a precoder corresponding to each of the plurality of RS resources; and
the step of transmitting the physical channel comprises using the indicated precoders on antennas of the UE associated with each of the indicated RS resources.
(c). The method of example embodiment (a) or (b), further comprising:
receiving an indication of at least one precoder corresponding to each of the at least one RS resources;
transmitting the physical channel using the indicated precoders on antennas of the UE associated with the indicated RS resource.
(d). The method of any of example embodiments (a)-(c), further comprising adjusting the transmitted power of a plurality of RS resources, wherein the RS resources are transmitted simultaneously and the transmitted power of each of the RS resources is adjusted by a power control command that is distinct from the power control commands adjusting the other RS resources.
(e). The method of any of example embodiments (a)-(d), wherein a plurality of RS resources are indicated to the UE, the method further comprising transmitting the physical channel on a plurality of antenna subsets corresponding to the plurality of indicated RS resources, using a precoder that jointly adjusts the phase of all RS ports comprised within the plurality of indicated RS resources.
(f). A method, in a network node of a wireless network, of receiving transmissions from a UE on different antenna subsets in the UE, the method comprising:
receiving an indication that the UE can transmit a number of distinct RS resources, wherein each of the RS resources comprises a number of RS ports;
receiving an indication of which RS resources the UE can transmit on simultaneously;
selecting at least one RS resource, based on the received indications;
transmitting an indication of the selected at least one RS resource to the UE;
receiving a physical channel transmitted by the UE on antennas of the LYE associated with the indicated at least one RS resource.
(g). The method of example embodiment (f), wherein the method further comprises receiving MIMO layers transmitted on different antenna subsets in the UE, wherein:
the method further comprises receiving an indication that the UE cannot control the relative phase between antenna ports corresponding to different RS resources while transmitting on the antenna ports;
the step of transmitting an indication of at least one RS resource comprises transmitting a plurality of RS resources and a precoder corresponding to each of the plurality of RS resources; and
the received physical channel is transmitted using the indicated precoders on antennas of the UE associated with each of the indicated RS resources.
(h). The method of example embodiment (f) or (g), further comprising:
receiving an indication of at least one precoder corresponding to each of the at least one RS resources;
transmitting the physical channel using the indicated precoders on antennas of the UE associated with the indicated RS resource.

(i). The method of any of example embodiments (f)-(h), further comprising transmitting, to the UE, power control commands for each of a plurality of RS resources of the UE, wherein the RS resources are transmitted simultaneously and the transmitted power of each of the RS resources is adjusted by a power control command that is distinct from the power control commands adjusting the other RS resources.

(j). The method of any of example embodiments (f)-(i), wherein a plurality of RS resources are indicated to the UE, the method further comprising receiving the physical channel transmitted on a plurality of antenna subsets corresponding to the plurality of indicated RS resources, using a precoder that jointly adjusts the phase of all RS ports comprised within the plurality of indicated RS resources.

(k). A UE adapted to transmit on different antenna subsets in the UE, the UE being adapted to:
  transmit an indication that the UE can transmit a number of distinct RS resources, wherein each of the RS resources comprises a number of RS ports;
  transmit an indication of which RS resources the UE can transmit on simultaneously;
  receive an indication of at least one RS resource;
  transmit a physical channel on antennas of the UE associated with the indicated at least one RS resource.

(l). The UE of example embodiment (k), wherein the UE is further adapted to transmit MIMO layers on different antenna subsets in the UE, wherein:
  the UE is adapted to provide an indication that the UE cannot control the relative phase between antenna ports corresponding to different RS resources while transmitting on the antenna ports;
  the UE is adapted to receive a plurality of RS resources and a precoder corresponding to each of the plurality of RS resources; and
  the UE is adapted to transmit the physical channel using the indicated precoders on antennas of the UE associated with each of the indicated RS resources.

(m). The UE of example embodiment (k) or (l), wherein the UE is further adapted to:
  receive an indication of at least one precoder corresponding to each of the at least one RS resources; and
  transmit the physical channel using the indicated precoders on antennas of the UE associated with the indicated RS resource.

(n). The UE of any of example embodiments (k)-(m), wherein the UE is further adapted to adjust the transmitted power of a plurality of RS resources, wherein the RS resources are transmitted simultaneously and the transmitted power of each of the RS resources is adjusted by a power control command that is distinct from the power control commands adjusting the other RS resources.

(o). The UE of any of example embodiments (k)-(n), wherein a plurality of RS resources are indicated to the UE, the UE being further adapted to transmit the physical channel on a plurality of antenna subsets corresponding to the plurality of indicated RS resources, using a precoder that jointly adjusts the phase of all RS ports comprised within the plurality of indicated RS resources.

(p). A network node of a wireless network adapted to receive transmissions from a UE on different antenna subsets in the UE, wherein the network node is adapted to:
  receive an indication that the UE can transmit a number of distinct RS resources, wherein each of the RS resources comprises a number of RS ports;
  receive an indication of which RS resources the UE can transmit on simultaneously;
  select at least one RS resource, based on the received indications;
  transmit an indication of the selected at least one RS resource to the UE;
  receive a physical channel transmitted by the UE on antennas of the UE associated with the indicated at least one RS resource.

(q). The network node of example embodiment (p), wherein the network node is adapted to receive MIMO layers transmitted on different antenna subsets in the UE, wherein the network node is adapted to:
  receive an indication that the UE cannot control the relative phase between antenna ports corresponding to different RS resources while transmitting on the antenna ports; and
  transmit, to the UE, a plurality of RS resources and a precoder corresponding to each of the plurality of RS resources; and
  wherein the received channel is transmitted by the UE using the indicated precoders on antennas of the UE associated with each of the indicated RS resources.

(r). The network node of example embodiment (p) or (q), wherein the network node is further adapted to:
  receive an indication of at least one precoder corresponding to each of the at least one RS resources;
  transmit the physical channel using the indicated precoders on antennas of the UE associated with the indicated RS resource.

(s). The network node of any of example embodiments (p)-(r), wherein the network node is further adapted to transmit, to the UE, power control commands for each of a plurality of RS resources of the UE, wherein the RS resources are transmitted simultaneously and the transmitted power of each of the RS resources is adjusted by a power control command that is distinct from the power control commands adjusting the other RS resources.

(t). The network node of any of example embodiments (p)-(s), wherein a plurality of RS resources are indicated to the UE, wherein the received physical channel is transmitted by the UE on a plurality of antenna subsets corresponding to the plurality of indicated RS resources, using a precoder that jointly adjusts the phase of all RS ports comprised within the plurality of indicated RS resources.

(u). A UE adapted to transmit on different antenna subsets in the UE, the UE comprising:
  a transceiver circuit;
  a processor operatively coupled to the transceiver circuit; and
  a memory coupled to the processing circuit, the memory storing instructions for execution by the processor, whereby the processor is configured to control the transceiver circuit to:
    transmit an indication that the UE can transmit a number of distinct RS resources, wherein each of the RS resources comprises a number of RS ports;

transmit an indication of which RS resources the UE can transmit on simultaneously;
receive an indication of at least one RS resource;
transmit a physical channel on antennas of the UE associated with the indicated at least one RS resource.

(v). The UE of example embodiment (u), wherein the processor is configured to transmit MIMO layers on different antenna subsets in the UE, wherein:
the processor is configured to transmit an indication that the UE cannot control the relative phase between antenna ports corresponding to different RS resources while transmitting on the antenna ports;
the processor is configured to receive a plurality of RS resources and a precoder corresponding to each of the plurality of RS resources; and
the processor is configured to transmit the physical channel using the indicated precoders on antennas of the UE associated with each of the indicated RS resources.

(w). The UE of example embodiment (u) or (v), wherein the processor is configured to:
receive an indication of at least one precoder corresponding to each of the at least one RS resources; and
transmit the physical channel using the indicated precoders on antennas of the UE associated with the indicated RS resource.

(x). The UE of any of example embodiments (u)-(w), wherein the processor is configured to adjust the transmitted power of a plurality of RS resources, wherein the RS resources are transmitted simultaneously and the transmitted power of each of the RS resources is adjusted by a power control command that is distinct from the power control commands adjusting the other RS resources.

(y). The UE of any of example embodiments (u)-(x), wherein a plurality of RS resources are indicated to the UE, the processor being further configured to transmit the physical channel on a plurality of antenna subsets corresponding to the plurality of indicated RS resources, using a precoder that jointly adjusts the phase of all RS ports comprised within the plurality of indicated RS resources.

(z). A network node of a wireless network adapted to receive transmissions from a UE on different antenna subsets in the UE, the network node comprising:
a transceiver circuit;
a processor operatively coupled to the transceiver circuit; and
a memory coupled to the processing circuit, the memory storing instructions for execution by the processor, whereby the processor is configured to control the transceiver circuit to:
receive an indication that the UE can transmit a number of distinct RS resources, wherein each of the RS resources comprises a number of RS ports;
receive an indication of which RS resources the UE can transmit on simultaneously;
select at least one RS resource, based on the received indications;
transmit an indication of the selected at least one RS resource to the UE;
receive a physical channel transmitted by the UE on antennas of the UE associated with the indicated at least one RS resource.

(aa). The network node of example embodiment (z), wherein the processor is configured to receive MIMO layers transmitted on different antenna subsets in the UE, wherein the processor is configured to:
receive an indication that the UE cannot control the relative phase between antenna ports corresponding to different RS resources while transmitting on the antenna ports; and
transmit, to the UE, a plurality of RS resources and a precoder corresponding to each of the plurality of RS resources; and
wherein the received channel is transmitted by the UE using the indicated precoders on antennas of the UE associated with each of the indicated RS resources.

(bb). The network node of example embodiment (z) or (aa), wherein the processor is configured to:
receive an indication of at least one precoder corresponding to each of the at least one RS resources;
transmit the physical channel using the indicated precoders on antennas of the UE associated with the indicated RS resource.

(cc). The network node of any of example embodiments (z)-(bb), wherein the processor is configured to transmit, to the UE, power control commands for each of a plurality of RS resources of the UE, wherein the RS resources are transmitted simultaneously and the transmitted power of each of the RS resources is adjusted by a power control command that is distinct from the power control commands adjusting the other RS resources.

(dd). The network node of any of example embodiments (z)-(cc), wherein a plurality of RS resources are indicated to the UE, wherein the received physical channel is transmitted by the UE on a plurality of antenna subsets corresponding to the plurality of indicated RS resources, using a precoder that jointly adjusts the phase of all RS ports comprised within the plurality of indicated RS resources.

(ee). A UE adapted to transmit on different antenna subsets in the UE, the UE comprising:
an indication transmitting module for transmitting an indication that the UE can transmit a number of distinct RS resources, wherein each of the RS resources comprises a number of RS ports, and for transmitting an indication of which RS resources the UE can transmit on simultaneously;
a receiving module for receiving an indication of at least one RS resource; and
a physical channel transmitting module for transmitting a physical channel on antennas of the UE associated with the indicated at least one RS resource.

(ff). A network node of a wireless network adapted to receive transmissions from a UE on different antenna subsets in the UE, the network node comprising:
an indication receiving module for receiving an indication that the UE can transmit a number of distinct RS resources, wherein each of the RS resources comprises a number of RS ports, and for receiving an indication of which RS resources the UE can transmit on simultaneously;
a selecting module for selecting at least one RS resource, based on the received indications;
a transmitting module for transmitting an indication of the selected one RS resource to the UE; and a physical channel receiving module for receiving a physical channel transmitted by the UE on antennas of the UE associated with the indicated at least one RS resource.

The invention claimed is:

1. A method, in a user equipment, UE, of transmitting on different antenna subsets in the UE, the method comprising:
   transmitting:
      an indication that the UE can transmit a number of distinct reference signal, RS, resources, and
      capability information that indicates that the UE is capable of transmitting simultaneously on multiple RS resources,
      wherein sets of RS resources are constructed such that no two RS resources in the same RS resource set are selectable for simultaneous transmission and each set is associated with a different antenna subset in the UE;
      wherein each of the multiple RS resources corresponds to a distinct frequency and comprises at least one RS port;
   receiving an indication of at least one RS resource; and
   transmitting a physical channel on antennas of the UE associated with the indicated at least one RS resource.

2. The method of claim 1, wherein the capability information indicates which RS resources the UE can transmit on simultaneously.

3. The method of claim 1, wherein the method further comprises transmitting Multiple Input Multiple Output, MIMO, layers on different antenna subsets in the UE, wherein:
   the method further comprises transmitting an indication that the UE cannot control the relative phase between antenna ports corresponding to different RS resources while transmitting on the antenna ports;
   the step of receiving an indication of at least one RS resource further comprises receiving an indication of a plurality of RS resources; and
   the step of transmitting the physical channel comprises transmitting a different MIMO layer associated with each of the indicated RS resources.

4. The method of claim 1, further comprising:
   receiving an indication of at least one precoder corresponding to each of the at least one RS resources; and
   transmitting the physical channel using the indicated precoders on antennas of the UE associated with the indicated RS resource.

5. The method of claim 1, further comprising adjusting the transmitted power of a PUSCH corresponding to one or more RS resource indicators or adjusting the transmitted power of one or more SRS resources corresponding to respective RS resource indicators, or both, wherein the transmitted power corresponding to each of the one or more RS resource indicators or each of the respective RS resource indicators is adjusted by power control commands that are distinct from power control commands adjusting transmitted power corresponding to others of the one or more RS resource indicators or respective RS resource indicators.

6. The method of claim 5, wherein a set of parameters is associated with each RS resource indicator, the method comprising using the set of parameters to determine the transmitted power, and wherein each set of parameters is distinct from sets of parameters associated with other RS resource indicators.

7. The method of claim 1, wherein a plurality of RS resources are indicated to the UE, the method further comprising transmitting the physical channel on a plurality of antenna subsets corresponding to the plurality of indicated RS resources, using a precoder that jointly adjusts the phase of all RS ports comprised within the plurality of indicated RS resources.

8. The method of claim 1, further comprising:
   receiving a first and a second RS configuration, wherein the first RS configuration is a first list of SRS resources that at least correspond to RS resource indications used for PUSCH transmission, and the second RS configuration is a second list of RS resources that may be used for SRS transmission.

9. A method, in a network node of a wireless network, of receiving transmissions transmitted from a user equipment, UE, on different antenna subsets in the UE, the method comprising:
   receiving:
      an indication that the UE can transmit a number of distinct reference signal, RS, resources, and
      capability information that indicates that the UE is capable of transmitting simultaneously on multiple RS resources,
      wherein sets of RS resources are constructed such that no two RS resources in the same RS resource set are selectable for simultaneous transmission and each set is associated with a different antenna subset in the UE;
      wherein each of the multiple RS resources corresponds to a distinct frequency and comprises at least one RS port;
   selecting at least one RS resource, based on the received indication;
   transmitting an indication of the selected at least one RS resource to the UE; and
   receiving a physical channel transmitted by the UE on antennas of the UE associated with the indicated at least one RS resource.

10. The method of claim 9, wherein the capability information indicates which RS resources the UE can transmit on simultaneously.

11. The method of claim 9, wherein the method further comprises receiving MIMO layers transmitted on different antenna subsets in the UE, wherein:
   the method further comprises receiving an indication that the UE cannot control the relative phase between antenna ports corresponding to different RS resources while transmitting on the antenna ports;
   the step of transmitting an indication of the selected at least one RS resource comprises transmitting an indication of a plurality of RS resources; and
   the received physical channel is received with a different layer associated with each of the indicated RS resources.

12. The method of claim 9, further comprising:
   transmitting an indication of at least one precoder corresponding to each of the at least one RS resources; and
   receiving the physical channel transmitted using the indicated precoders.

13. The method of claim 9, further comprising transmitting, to the UE, power control commands corresponding to each of a plurality of RS resource indicators for the UE, so as to adjust transmitted power corresponding to each of the RS resource indicators with power control commands that are distinct from power control commands adjusting transmitted power corresponding to other RS resource indicators.

14. The method of claim 9, wherein a plurality of RS resources are indicated to the UE, the method further comprising receiving the physical channel transmitted on a plurality of antenna subsets corresponding to the plurality of indicated RS resources, using a precoder that jointly adjusts the phase of all RS ports comprised within the plurality of indicated RS resources.

15. A user equipment, UE, adapted to transmit on different antenna subsets in the UE, the UE comprising:
   a transceiver circuit;
   a processing circuit operatively coupled to the transceiver circuit; and
   a memory coupled to the processing circuit, the memory storing instructions for execution by the processing circuit, whereby the processing circuit is configured to control the transceiver circuit to:
   transmit:
      an indication that the UE can transmit a number of distinct reference signal, RS, resources, and
      capability information that indicates that the UE is capable of transmitting simultaneously on multiple RS resources,
      wherein sets of RS resources are constructed such that no two RS resources in the same RS resource set are selectable for simultaneous transmission and each set is associated with a different antenna subset in the UE;
      wherein each of the multiple RS resources corresponds to a distinct frequency and comprises at least one RS port;
   receive an indication of at least one RS resource; and
   transmit a physical channel on antennas of the UE associated with the indicated at least one RS resource.

16. The UE of claim 15, wherein the capability information indicates which RS resources the UE can transmit on simultaneously.

17. The UE of claim 15, wherein the processing circuit is configured to transmit MIMO layers on different antenna subsets in the UE, wherein the processing circuit is configured to:
   transmit an indication that the UE cannot control the relative phase between antenna ports corresponding to different RS resources while transmitting on the antenna ports;
   receive a plurality of RS resources; and
   transmit a different MIMO layer associated with each of the indicated RS resources.

18. The UE of claim 15, wherein the processing circuit is configured to:
   receive an indication of at least one precoder corresponding to each of the at least one RS resources; and
   transmit the physical channel using the indicated precoders on antennas of the UE associated with the indicated RS resource.

19. The UE of claim 15, wherein the processing circuit is configured to adjust the transmitted power of a PUSCH corresponding to one or more RS resource indicators or to adjust the transmitted power of one or more SRS resources corresponding to respective RS resource indicators, or both, wherein the transmitted power corresponding to each of the one or more RS resource indicators or each of the respective RS resource indicators is adjusted by power control commands that are distinct from power control commands adjusting transmitted power corresponding to others of the one or more RS resource indicators or respective RS resource indicators.

20. The UE of claim 19, wherein a set of parameters is associated with each RS resource indicator, wherein the processing circuit is further configured to use the set of parameters to determine the transmitted power, and wherein each set of parameters is distinct from sets of parameters associated with other RS resource indicators.

21. The UE of claim 15, wherein a plurality of RS resources are indicated to the UE, the processing circuit being further configured to transmit the physical channel on a plurality of antenna subsets corresponding to the plurality of indicated RS resources, using a precoder that jointly adjusts the phase of all RS ports comprised within the plurality of indicated RS resources.

22. A network node of a wireless network adapted to receive transmissions transmitted from a user equipment, UE, on different antenna subsets in the UE, the network node comprising:
   a transceiver circuit;
   a processing circuit operatively coupled to the transceiver circuit; and
   a memory coupled to the processing circuit, the memory storing instructions for execution by the processing circuit, whereby the processing circuit is configured to control the transceiver circuit to:
   receive:
      an indication that the UE can transmit a number of distinct reference signal, RS, resources, and
      capability information that indicates that the UE is capable of transmitting simultaneously on multiple RS resources,
      wherein sets of RS resources are constructed such that no two RS resources in the same RS resource set are selectable for simultaneous transmission and each set is associated with a different antenna subset in the UE;
      wherein each of the multiple RS resources corresponds to a distinct frequency and comprises at least one RS port;
   select at least one RS resource, based on the received indication;
   transmit an indication of the selected at least one RS resource to the UE; and
   receive a physical channel transmitted by the UE on antennas of the UE associated with the indicated at least one RS resource.

23. The network node of claim 22, wherein the capability information indicates which RS resources the UE can transmit on simultaneously.

24. The network node of claim 22, wherein the processing circuit is configured to receive MIMO layers transmitted on different antenna subsets in the UE, wherein the processing circuit is configured to:
   receive an indication that the UE cannot control the relative phase between antenna ports corresponding to different RS resources while transmitting on the antenna ports; and
   transmit, to the UE, a plurality of RS resources;
   wherein the received channel is received with a different layer associated with each of the indicated RS resources.

25. The network node of claim 22, wherein the processing circuit is configured to:
   transmit an indication of at least one precoder corresponding to each of the at least one RS resources; and
   receive the physical channel transmitted using the indicated precoders.

26. The network node of claim 22, wherein the processing circuit is configured to transmit, to the UE, power control commands corresponding to each of a plurality of RS resource indicators for the UE, so as to adjust transmitted power corresponding to each of the RS resource indicators with power control commands that are distinct from power control commands adjusting transmitted power corresponding to other RS resource indicators.

27. The network node of claim 22, wherein a plurality of RS resources are indicated to the UE, wherein the received physical channel is transmitted by the UE on a plurality of antenna subsets corresponding to the plurality of indicated RS resources, using a precoder that jointly adjusts the phase of all RS ports comprised within the plurality of indicated RS resources.

28. A computer program product comprising program instructions for a processor in a user equipment, UE, wherein said program instructions are configured so as to cause the UE to carry out a method when the program instructions are executed by the processor, the method comprising:
   transmitting:
      an indication that the UE can transmit a number of distinct reference signal, RS, resources, and
      capability information that indicates that the UE is capable of transmitting simultaneously on multiple RS resources,
      wherein sets of RS resources are constructed such that no two RS resources in the same RS resource set are selectable for simultaneous transmission and each set is associated with a different antenna subset in the UE;
      wherein each of the multiple RS resources corresponds to a distinct frequency and comprises at least one RS port;
   receiving an indication of at least one RS resource; and
   transmitting a physical channel on antennas of the UE associated with the indicated at least one RS resource.

29. A computer program product comprising program instructions for a processor in a network node, wherein said program instructions are configured so as to cause the network node to carry out a method when the program instructions are executed by the processor, the method comprising:
   receiving:
      an indication that the UE can transmit a number of distinct reference signal, RS, resources, and
      capability information that indicates that the UE is capable of transmitting simultaneously on multiple RS resources,
      wherein sets of RS resources are constructed such that no two RS resources in the same RS resource set are selectable for simultaneous transmission and each set is associated with a different antenna subset in the UE;
      wherein each of the multiple RS resources corresponds to a distinct frequency and comprises at least one RS port;
   selecting at least one RS resource, based on the received indication;
   transmitting an indication of the selected at least one RS resource to the UE; and
   receiving a physical channel transmitted by the UE on antennas of the UE associated with the indicated at least one RS resource.

* * * * *

UNITED STATES PATENT AND TRADEMARK OFFICE
CERTIFICATE OF CORRECTION

PATENT NO. : 12,166,541 B2
APPLICATION NO. : 16/621500
DATED : December 10, 2024
INVENTOR(S) : Harrison et al.

It is certified that error appears in the above-identified patent and that said Letters Patent is hereby corrected as shown below:

In the Specification

In Column 1, Line 28, delete "waves" and insert -- (mm waves --, therefor.

In Column 2, Line 8, delete "C-INTI" and insert -- C-RNTI --, therefor.

In Column 3, Line 58, delete "(Sills)" and insert -- (SRIs) --, therefor.

In Column 4, Line 16, delete "ON" and insert -- CQI --, therefor.

In Column 4, Line 32, delete "IS" and insert -- TS --, therefor.

In Column 5, Line 39, delete "SINK" and insert -- SINR --, therefor.

In Column 5, Line 47, delete "HE" and insert -- UE --, therefor.

In Column 6, Line 2, delete "preceding" and insert -- precoding --, therefor.

In Column 9, Line 44, delete "to processor," and insert -- processor, --, therefor.

In Column 12, Line 25, delete "0 . . . N-1" and insert -- 0 . . . $N_b$-1 --, therefor.

In Column 13, Line 21, delete "in in" and insert -- m in --, therefor.

In Column 13, Line 22, delete "mare" and insert -- m are --, therefor.

In Column 13, Line 65, delete "SRI∈51" and insert -- SRI∈{4,5} --, therefor.

In Column 15, Line 48, delete "each" and insert -- each TPMI --, therefor.

Signed and Sealed this
Twenty-ninth Day of April, 2025

Coke Morgan Stewart
*Acting Director of the United States Patent and Trademark Office*

CERTIFICATE OF CORRECTION (continued)
U.S. Pat. No. 12,166,541 B2

In Column 15, Line 51, delete "icy" and insert -- by --, therefor.

In Column 17, Line 4, delete "Equipped" and insert -- Equipment --, therefor.

In Column 17, Line 5, delete "dangles," and insert -- dongles, --, therefor.

In Column 20, Line 33, delete "for" and insert -- for UL-MIMO --, therefor.

In Column 21, Line 31, delete "MEMO" and insert -- MIMO --, therefor.

In Column 23, Line 10, delete "LTEs" and insert -- UEs --, therefor.

In Column 26, Line 8, delete "preceding," and insert -- precoding, --, therefor.

In Column 26, Line 31, delete "LITE" and insert -- UE --, therefor.

In Column 28, Line 44, delete "LYE" and insert -- UE --, therefor.

In Column 32, Line 67, delete "one" and insert -- at least one --, therefor.